(12) United States Patent
Kurosawa et al.

(10) Patent No.: US 6,636,579 B2
(45) Date of Patent: Oct. 21, 2003

(54) DEVICE AND METHOD FOR REPAIRING INSIDE OF REACTOR PRESSURE VESSEL

(75) Inventors: Kouichi Kurosawa, Hitachi (JP); Youichi Mahara, Hiroshima (JP); Toshiharu Nagashima, Kure (JP); Kazuhiro Nitta, Kure (JP); Shinji Go, Hitachi (JP); Yoshitoshi Suzuki, Takahagi (JP); Katsuhiko Hirano, Hitachi (JP)

(73) Assignees: Hitachi, Ltd., Tokyo (JP); Babcock-Hitachi K.K., Tokyo (JP); Hestec Service Co., Ltd., Ibaraki (JP)

( * ) Notice: Subject to any disclaimer, the term of this patent is extended or adjusted under 35 U.S.C. 154(b) by 0 days.

(21) Appl. No.: 09/951,898

(22) Filed: Sep. 14, 2001

(65) Prior Publication Data

US 2002/0064250 A1 May 30, 2002

(30) Foreign Application Priority Data

Nov. 30, 2000 (JP) ........................ 2000-365807

(51) Int. Cl.[7] .............................................. G21C 17/01
(52) U.S. Cl. ...................................... 376/305; 376/260
(58) Field of Search ................................ 376/260, 261, 376/262, 263, 305

(56) References Cited

U.S. PATENT DOCUMENTS

| | | | | |
|---|---|---|---|---|
| 3,072,554 A | * | 1/1963 | Madsen ...................... 376/263 |
| 4,219,976 A | * | 9/1980 | Burack et al. ................. 451/38 |
| 4,595,419 A | * | 6/1986 | Patenaude ...................... 134/1 |
| 4,639,351 A | * | 1/1987 | Forner et al. ................. 376/310 |
| 4,672,741 A | * | 6/1987 | Zafred et al. .................. 29/726 |
| 4,954,312 A | * | 9/1990 | McDonald et al. ........... 376/260 |
| 5,042,861 A | * | 8/1991 | Trundle et al. ............. 294/19.1 |
| 5,054,187 A | * | 10/1991 | Sigel ............................. 29/507 |
| 5,169,593 A | * | 12/1992 | Kazirskis et al. ............ 376/260 |
| 5,271,046 A | * | 12/1993 | Dirauf et al. ................ 376/249 |
| 5,420,898 A | * | 5/1995 | Steagall ....................... 376/252 |
| 5,460,045 A | * | 10/1995 | Clark et al. .................... 73/622 |
| 5,483,561 A | * | 1/1996 | Bystrak ....................... 376/258 |
| 5,502,754 A | * | 3/1996 | Erbes ........................... 376/302 |
| 5,504,788 A | * | 4/1996 | Brooks et al. ............... 376/248 |
| 5,737,377 A | * | 4/1998 | Stefko et al. ................ 376/268 |
| 5,790,619 A | * | 8/1998 | Peck ............................ 376/299 |
| 5,809,099 A | * | 9/1998 | Kim et al. .................... 376/249 |
| 6,058,153 A | * | 5/2000 | Kurosawa et al. ........... 376/249 |
| 6,341,151 B1 | * | 1/2002 | Enomoto et al. ............ 376/305 |

FOREIGN PATENT DOCUMENTS

| | | | | |
|---|---|---|---|---|
| JP | 05333188 A | * | 12/1993 | ................ 376/245 |
| JP | 9-159788 | | 6/1997 | |
| JP | 9-211182 | | 8/1997 | |
| JP | 10197679 A | * | 7/1998 | ................ 376/245 |
| JP | 11-109082 | | 4/1999 | |
| JP | 11-174192 | | 7/1999 | |
| JP | 2000-258587 | | 9/2000 | |

* cited by examiner

Primary Examiner—Michael J. Carone
Assistant Examiner—Daniel Matz
(74) Attorney, Agent, or Firm—Crowell & Moring LLP

(57) ABSTRACT

An opening portion 3 is produced by cutting a recirculating piping 72 connected to a recirculating nozzle 2 of a reactor pressure vessel 1. A repairing device is brought into an annulus 10 of the reactor pressure vessel 1 from the opening 3, thereby repairing the annulus 10.

7 Claims, 20 Drawing Sheets

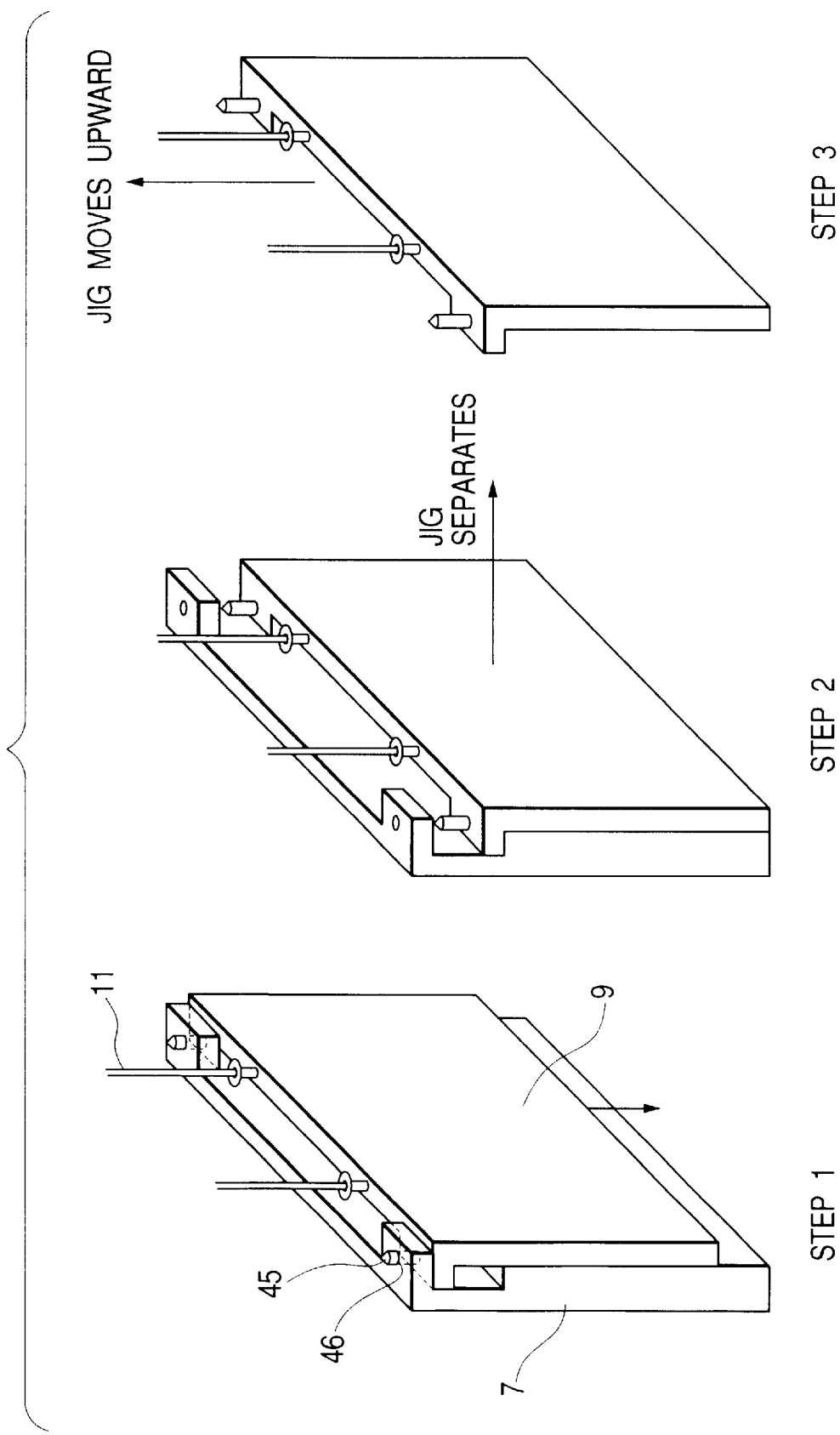

INNER WALL TO BE STUCK TO 32
(WHEN SWINGS)

POINT A : CENTER OF INNER DRIVING ROLLER
POINT B : CENTER OF OUTER DRIVING ROLLER
POINT C : OUTER DRIVING ROLLER (AFTER FOLDING)

$$R=\sqrt{\left(\frac{r+2D\cos\theta}{2\sin\theta}\right)^2+D^2}$$

CURVATURE RADIUS=R+RADIUS OF DRIVING ROLLER

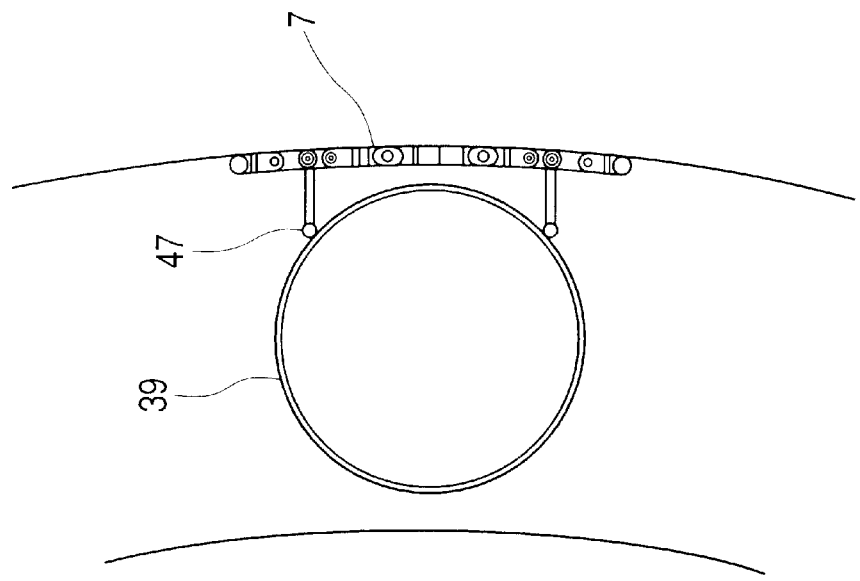
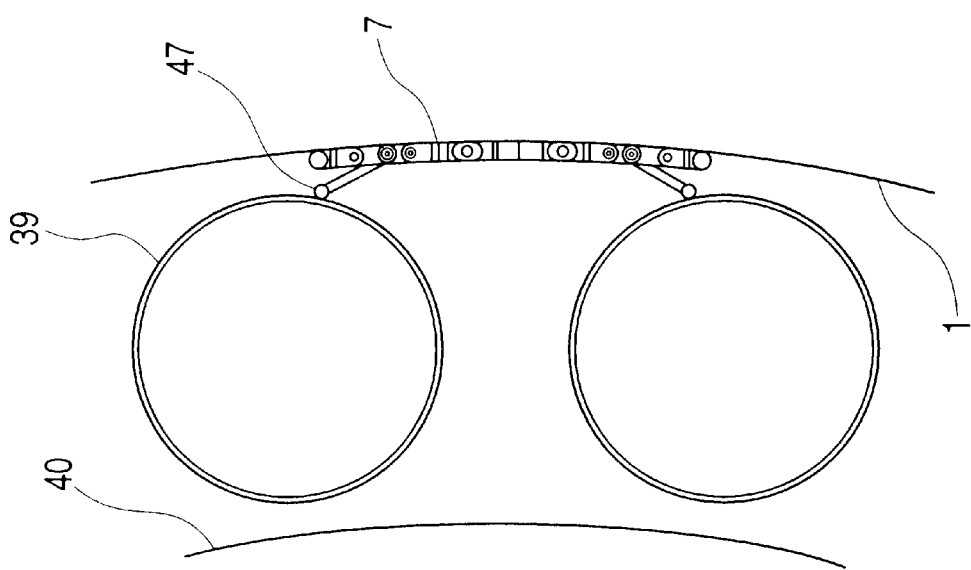

DEVICE AND METHOD FOR REPAIRING INSIDE OF REACTOR PRESSURE VESSEL

BACKGROUND OF THE INVENTION

The present invention relates to repairing for a reactor pressure vessel and structures inside the reactor pressure vessel in service, particularly a method and a device for repairing an annulus of the pressure vessel while nuclear fuel and coolant are removed.

Though safety has a priority in any devices, the safety of a reactor pressure vessel has the highest priority in a nuclear power plant, and repairing the nuclear pressure vessel and structures inside the nuclear pressure vessel during service period is prescribed.

The repairing operation for the pressure vessel is usually conducted while a repairing device is installed inside the vessel. The prior art adopts an operation procedure, in which the repairing device is inserted into the pressure vessel from the top of the nuclear reactor, and the device is taken out after the repairing operation.

During the repairing operation, usually the pressure vessel is filled with water, and remote control devices with submersible capability are used in order to reduce the exposure to nuclear radiation of operators.

Usually a chain block is used for installing the repairing device, and a method of lifting the repairing device, and inserting it into and taking it out from the pressure vessel is adopted. When the repairing device is being lift down to a baffle plate of the annulus, it is difficult to check the position of lifting down from the top of the nuclear reactor since the structures inside the nuclear reactor stand together in the course.

Also, since this is a complicated operation requiring monitoring with a submersible television camera for an interference of the repairing device, the operation takes a long period.

Here, the annulus is a space in a toric shape formed in a part surrounded by an inner wall face of the pressure vessel outside a core shroud in the pressure vessel of a boiling water reactor.

Thus, in the prior art, the situation described above is a serious problem for reducing the exposure and shortening the process.

In addition, since the remote control devices with submersible capability require a waterproof seal structure or a waterproof pipe to be installed, designing such a device is demanding, and largely increases the cost.

In addition, welding and PT (liquid penetrant flaw detection) inspection require making the inside of the pressure vessel aerial. After the repairing device is installed, reactor water is drained the for operation. After the operation, the pressure vessel is filled with water to remove the repairing device. This repeated filling/draining operation extends the operation period, and increases the operation cost.

For instance, as described in Japanese Application Patent Laid-open Publication Nos. Hei 09-159788, Hei 09-211182, and 2000-258587, devices are disclosed for allowing individual operations of inspecting, repairing, and preventively maintaining structures in the nuclear reactor such as a jet pump and an outer surface of a shroud installed in the annulus while water is filled.

In this case, since the operation is conducted under water, it has a large effect on reducing the exposure of the repairing device itself and operators when installing the device. However as described before, the operation is conducted remotely, the operation is extremely difficult, and the increase of cost is not negligible. Further, the welding and the PT inspection in the repairing operation should be aerial, and they require filling/draining water in the reactor repeatedly, resulting in a problem of the extended operation period as described before.

On the other hand, Japanese Application Patent Laid-open Publication Nos. Hei 11-174192 and Hei 11-109082, for example, disclose devices, which have access to the annulus in the water and travel automatically on the baffle plate through remote operation for nondestructive inspection. Even in this case, as described before, since the remote operation under water is assumed, the operation is extremely difficult, and if a repairing is required, these devices cannot apply to the repairing and the repairing device since the repairing should be aerial.

The prior art described before does not consider repairing applied to an annulus of a pressure vessel, and has the problem of difficult operation and extended work period.

If the prior art is applied to repairing of a reactor pressure vessel in service, installing/removing the repairing device are conducted in water, and operations such as welding and PT inspection are conducted in air.

It takes a fairly long time to drain and to fill reactor water in the pressure vessel.

Installing/removing the repairing device requires monitoring with a submersible camera for an interference of the repairing device with the structures in the reactor. Further, when the repairing device is inserted into the annulus, since it is difficult to determine the position of the repairing device, the repairing operation becomes extremely difficult.

The previous art causes the problem of difficulty in the repairing operation and the extended work period.

Also, since the repairing device should be installed/removed under water, the repairing device should have waterproof capability, resulting in a large cost in design and production.

Further, the previous art does not provide a technique for repairing from the both sides when repairing is difficult for an operation from one side of the pressure vessel.

SUMMARY OF THE INVENTION

The purpose of the present invention is to provide a method and a device for repairing the inside of a pressure vessel of a nuclear reactor, which conduct the repairing operation in an annulus of the reactor pressure vessel easily in a short period.

The purpose described before is achieved such that coolant in a reactor pressure vessel of a boiling water reactor provided with a recirculating nozzle is drained, a recirculating piping connected to said recirculating nozzle is cut to produce an opening connected to said recirculating nozzle, the repairing device is brought into said annulus in said reactor pressure vessel from said opening, and said repairing device repairs the inside of said annulus.

The purpose described before is also achieved such that coolant in a reactor pressure vessel of a boiling water reactor provided with a recirculating nozzle is drained, a recirculating piping connected to said recirculating nozzle is removed from a recirculating pump to produce an opening connected to said recirculating nozzle, the repairing device is brought into said annulus in said reactor pressure vessel from said opening, and said repairing device repairs the inside of said annulus Simultaneously, the purpose described before is also achieved such that either inspecting a repaired part with a camera, installing monitoring cameras during repairing, detecting flaws with ultrasonic or beveling for repairing with electrical discharge machining is conducted from the top of said pressure vessel before the coolant in said reactor pressure vessel is drained.

Simultaneously, the purpose described before is also achieved such that said repairing device is brought into said reactor pressure vessel through said opening, said repairing device is lifted up/down with a jig for lifting-up/down, said repairing device is separated from said jig for lifting-up/down after it reaches the height of a baffle plate, said repairing device is mounted on said jig for lifting-up/down again after repairing the inside of the reactor, and the repairing device is recovered from the inside of the reactor.

The purpose described before is also achieved such that said jig for lifting-up/down is brought in by a straight or curved guide held by a jig for bringing-in through said opening.

This allows installing the repairing device to the annulus to be repaired without interfering with constituting devices in a nuclear reactor. Since the distance between a recirculating water outlet nozzle and the annulus is short, and the repairing device can pass while avoiding a reactor core area with high nuclear radiation, the degradation of the repairing device due to the nuclear radiation is avoided.

Also this allows traveling the repairing device in parallel from said opening to the inner wall of the reactor pressure vessel, and to travel the repairing device horizontally along the inner wall of the reactor pressure vessel from the height of said opening and to the application height for the repairing operation, thereby minimize a driving part required for the repairing device and reducing the seize of the repairing device, resulting in providing a margin for traveling of the repairing device on the annulus. This also allows inserting the repairing device into the nuclear reactor after the repairing device is aligned to the direction for the operation before hand, thereby making the travel in the reactor easily.

The purpose described before is achieved by a repairing device comprising an operation tool for repairing an inside of an annulus when coolant in a reactor pressure vessel of a boiling water reactor provided with a recirculating nozzle is drained, a recirculating piping connected to said recirculating nozzle is cut to produce an opening connected to said recirculating nozzle, the repairing device is brought into said annulus in said reactor pressure vessel from said opening, and suction disk pads for maintaining the attitude by sticking to a wall face inside said annulus.

The purpose described before is also achieved by a repairing device comprising an operation tool for repairing an inside of an annulus when coolant in a reactor pressure vessel of a boiling water reactor provided with a recirculating nozzle is drained, a recirculating piping connected to said recirculating nozzle is cut to produce an opening connected to said recirculating nozzle, the repairing device is brought into said annulus in said reactor pressure vessel from said opening, and suction disk pads and driving rollers for traveling in the horizontal direction or for turning while maintaining the attitude by sticking to a wall face inside said annulus.

Simultaneously, said repairing device may have multiple joints for freely changing the shape according to the curvature of the wall face inside said annulus, or said repairing device may be simultaneously provided with encoders so as to detect the rotations of said driving rollers and the angle of said joints, and is constituted so as to calculate at least either a position inside said reactor pressure vessel, the curvature of the inner wall face, or a distance between the nuclear pressure vessel and a jet pump diffuser.

Simultaneously, said repairing device may be simultaneously provided with double-sided suction disk pads for traveling on a discontinued and separated wall faces such as from a wall face of the reactor pressure vessel to an outer face of the jet pump diffuser.

Simultaneously, the purpose described before is also achieved such that said repairing device is provided with an operation tool driving mechanism conducting at least one type of motion of moving said operation tool up/down, rotationally, and while swinging it, said operation tool is either a welding torch, a laser head, an electric discharge machining device, a camera, a grinder, a dust collector, a device for applying liquid penetrant for detecting flaws, cleaning, and inspecting, an ultrasonic probe, or a dimension measuring device, and these tools are changed to conduct repairing such as welding, laser machining, electric discharge machining, visual inspection, polishing, grinding, collection dusts and chips, detecting flaws with liquid penetration, detecting flaws with ultrasonic, and measuring dimension.

Simultaneously, the purpose described before is also achieved such that the operation tool installed on said repairing device is a cable/hose relay box, said repairing device is brought inside the annulus after a first repairing device including the operation tool to relay cables and the hoses for the first repairing device, and said repairing device supports routing cables and hoses from the nozzle to the first repairing device.

Simultaneously, said repairing device may be constituted such that the repairing device extends arms or cushions to a wall face on the opposite side for pushing the wall face for fixing when the device is fixed on a part of a wall face where the suction with the suction disks is difficult.

Simultaneously, the purpose described before is also achieved such that said jig for bringing-in is provided with a member for shielding radiation so as to add a function for shielding radiation irradiated from the reactor pressure vessel when a operator comes close to a cut part on a recirculating piping, an outlet nozzle for recirculating water, or a safe end of the outlet nozzle for recirculating water.

Simultaneously, the purpose described before is also achieved such that said jig for bringing-in is provided with a bendable self-traveling mechanism, and is constituted so as to travel by itself to bringing in said repairing device when said repairing device is brought into the reactor pressure vessel through a bent piping from said opening.

Simultaneously, the purpose described before is also achieved such that said device for applying liquid penetrant for detecting flaws, cleaning, and inspecting has an airbag mechanism and a liquid suction nozzle, and an enclosed space is formed around a part to be repaired by pressing said airbag mechanism against the part to be repaired, thereby sucking the liquid penetrant for detecting flaws and cleaning liquid without diffusing, resulting in eliminating cleaning a wide area other than the subject part.

Simultaneously, the purpose described before is achieved such that said electric discharge machining device is provided with an airbag mechanism, a machining liquid injection nozzle, a machining liquid suction nozzle, and an electric discharge machining electrode, and an enclosed space is formed around a part to be repaired by pressing said airbag mechanism against the part to be repaired, the electric discharge electrode is pressed on a face to be machined to conduct electric discharge machining while the machining liquid is flowing from said machining liquid injection nozzle, thereby sucking machining chips without diffusing, resulting in enabling local electric discharge machining under an aerial environment without water.

Simultaneously, the purpose described before is achieved such that inspecting a part to be repaired with a camera from the top of the reactor pressure vessel and beveling for repairing with an electric discharge device brought to the part to be repaired through a guide pipe installed in water are conducted from both the annulus side and the inside of the nuclear reactor in a submersed state before coolant in the reactor pressure vessel is drained, the repairing device is brought in with said method from an opening of recirculating piping, an outlet nozzle for recirculating water, or a safe end of the outlet nozzle for recirculating water in an aerial state after coolant is drained, another repairing device is brought in the nuclear reactor through said guide pipe from the top of the reactor pressure vessel, repairing operation is conducted both from the annulus side and the inside of the nuclear reactor side, and the same part is repaired from the both sides.

With the mean described before, attaching the suction disk pads to the repairing device easily holds the repairing device at a certain position for repairing operation.

Attaching the driving rollers for traveling to the repairing device provided with the suction disk pads allows the repairing device to travel by rotating the driving rollers while the suction force is maintained, thereby traveling rotationally while maintaining the same height around the structures in the annulus, resulting in having access to a part to be repaired.

Further, since the repairing device is constituted as a symmetrical multiple joint structure and is provided with the disk pads on the both sides, when the repairing device is installed the annulus, folding said joint on one side move that side of the repairing device to a neighboring structure in the reactor, and the suction disk pad holds that side of the repairing device to said neighboring structure. Folding the joint on the other side to the structure to which the repairing device travels onto moves the entire repairing device to the neighboring structure in the reactor.

The position in the reactor and the curvature and the like of the wall face of a structure to which the repairing device sticks are obtained by detecting and calculating the rotations of the driving rollers with the encoders, thereby obtaining precise position information and shape information of the structure.

The design of the device is unified by mounting and changing the operation tools for repairing according to the purpose on said repairing device, thereby decreasing the cost for design and production, and increasing the reliability, resulting in allowing various repairing operations in the annulus.

The load on routing cables and hoses for the repairing device is eliminated when the repairing device is reaching a part far from the outlet nozzle by installing a cable/hose relay box on a second repairing device, and bringing the second repairing device into a nuclear reactor as an auxiliary carriage for handling cables, thereby reducing trouble potential caused by the cable handling, resulting in a reliable operation.

Said repairing device provided with the suction disk pads are fixed by extending arms or cushions to a direction opposite to the wall face to which the device sticks, thereby fixing the device stably on a wall face with recesses and protrusions.

The opening has a high dose rate, and is a hard environment for operators to approach since nuclear radiation from the reactor pressure vessel is irradiated from the nozzle or the opening of the piping.

Providing a shielding capability for a jig for bringing-in to shield the radiation from the opening makes the environment easy to approach.

If there is a bent part in a bringing-in path from the opening to the annulus, using self-traveling bringing-in device as a jig for bringing-in enables to bring in the repairing device to the annulus.

When liquid penetrant flaw detecting inspection is conducted, installing airbag mechanism and a liquid suction nozzle to a liquid penetrant flaw detecting device enables to press the airbags to a part to be repaired to form an enclosed space, thereby sucking liquid penetrant for detecting flaws and cleaning liquid without diffusing, resulting in eliminating cleaning a wide area other than the subject part.

For an electric discharge machining for eliminating flaws and beveling for repair, an electric discharge machining device is provided with an airbag mechanism, a machining liquid injection nozzle, and a machining liquid suction nozzle and an enclosed space is formed by pressing said airbag mechanism against the part to be repaired, and electric discharge machining is conducted in said enclosed space thereby sucking machining chips and the machining liquid without diffusing, resulting in local electric discharge machining under an aerial environment without water while maintaining the surrounded area clean.

For a method inspecting a part to be repaired and removing flaws, inspecting and repairing simultaneously or alternately from the annulus side and the inside of the reactor effectively applies a highly reliable inspection and repair to a wide area.

BRIEF DESCRIPTION OF THE DRAWINGS

FIG. 6 is a diagram describing an action to remove the repairing device from a lift with an embodiment of the present invention.

FIGS. 13(a) and 13(b) each show a fixing motion with pushing arms of an embodiment of the repairing device with the present invention.

DETAILED DESCRIPTION OF THE INVENTION

The following section describes a repairing method and a repairing device for the inside of a reactor pressure vessel according to the present invention using embodiments described in drawings.

Figure 17:
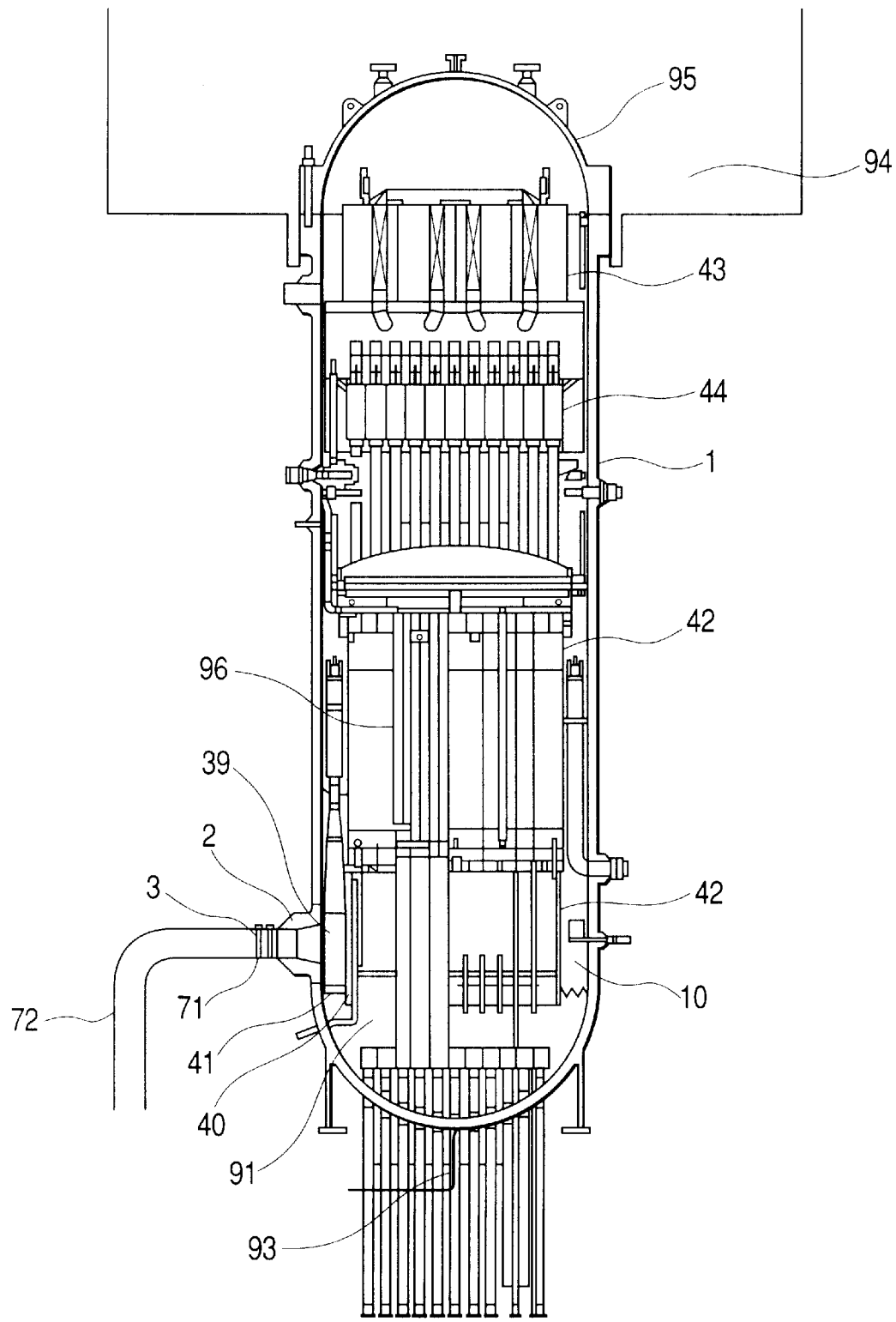
FIG. 17 is a diagram describing one example of a pressure vessel of a boiling water nuclear reactor which is an application subject of a method and a device for repairing the inside of a reactor pressure vessel with the present invention.

First, an example of a reactor pressure vessel, which is an application subject of the present invention is described using FIG. 17.

FIG. 17 shows a reactor pressure vessel and structures inside a nuclear reactor in a nuclear power plant using a boiling water type light water reactor, and the entire reactor pressure vessel is indicated as 1.

A dryer 43, a separator 44, a shroud support cylinder 40 and a reactor core shroud 42 supported by the shroud support cylinder 40 are installed in this reactor pressure vessel 1. A nuclear fuel assembly 96 is stored in the reactor core shroud 42.

As an example of the sizes of the reactor pressure vessel 1, the inner diameter is about 6.5 m, and the outer diameter of the reactor core shroud 42 is about 5 m.

An RPV head 95 for sealing the nuclear reactor, the nuclear fuel assembly 96, and a nuclear reactor well 94, which is filled with water when machines in the reactor are removed to serve as a pool for transporting path for removed machines are provided on the top of the reactor pressure vessel 1. Here, RPV stands for Reactor Pressure Vessel.

A recirculating water outlet nozzle 2 is installed on the bottom of the reactor pressure vessel 1. A jet pump 39 installed on a baffle plate 41 exists in a cylindrical space surrounded by an inner wall of the pressure vessel 1 and the reactor core shroud 42. This toric narrow space in which this jet pump 39 is installed is the annulus 10 described before.

A space inside the reactor core shroud 42 and below the baffle plate 41 other than this annulus 10 is called an inside of the reactor 91.

A drain piping 93 is provided on the bottom of the pressure vessel 1 to drain the coolant in the vessel.

The present invention relates to a repairing method and a repairing device for welded parts close to the annulus 10 such as a welded part between the reactor pressure vessel 1 and the baffle plate 41, a welded part between the baffle plate 41 and the shroud support cylinder 40, a welded part between the shroud 42 and shroud support cylinder 40, or a welded part between the baffle plate 41 and the jet pump in the annulus 10. The following part describes the detail along with embodiments indicated in drawings.

Figure 1:
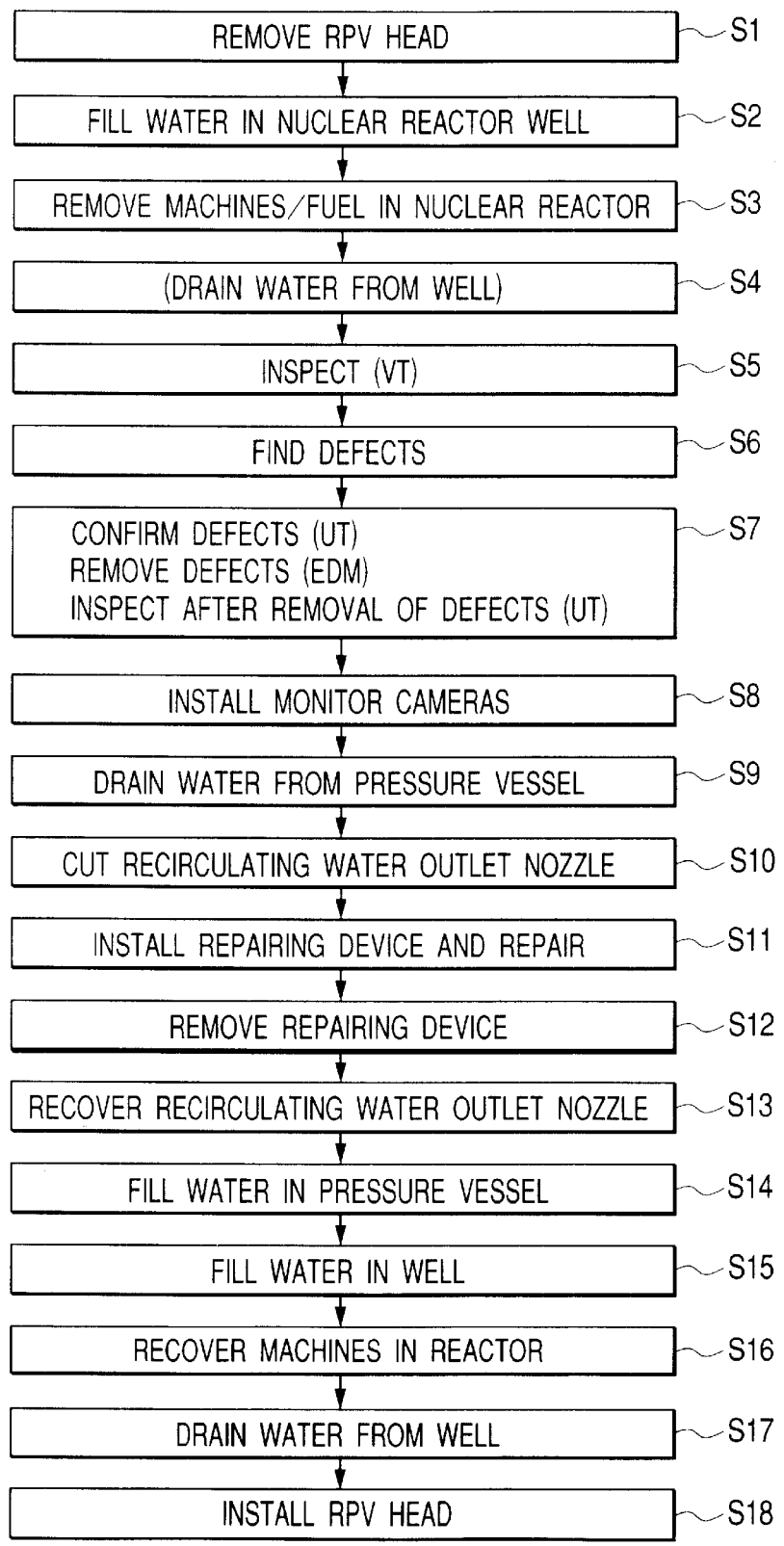
FIG. 1 is a flowchart indicating an embodiment of a repairing method for a reactor pressure vessel with the present invention.

FIG. 1 is a flowchart indicating a method for repairing the inside of the annulus with an embodiment of the present invention. According to FIG. 1 with reference to FIG. 17, a repairing operation based on the steps in FIG. 1 begins with a process of removing the RPV head 95 from the reactor pressure vessel 1, i.e. nuclear reactor opening process S1.

The nuclear reactor well 94 is filled with water to reduce radiation exposure (S2). The machines inside the reactor such as the dryer 43 and the separator 44, and the nuclear fuel assembly 96 are removed from the reactor pressure vessel 1, and are taken out from the top (S3). Depending on the condition, a process for draining the water in the nuclear reactor well 94, i.e. well draining S4 is conducted.

The annulus 10 is inspected with VT (visual inspection) (S5). If a defect is found (S6), UT (ultrasonic flaw detecting inspection) is used to check the position and the extent of the defect. EDM (electric discharge machining) is employed to remove the defect. Then, UT (ultrasonic flaw detecting inspection) is used to check if the defect is removed (S7).

Monitoring cameras (not limited to one) are installed in order to monitor the entire repairing operation for the annulus 10 (S8).

The cables for the monitoring cameras are pulled out from the top of the reactor through a narrow gap left between the reactor pressure vessel 1 and RPV head 95.

The installation of the monitoring cameras may be skipped, and the number of the installed camera may be reduced. The detail is described later.

The reactor water is drained from the pressure vessel 1 (S9). Any two parts of the recirculating water outlet nozzle 2, a recirculating water outlet nozzle safe end 71, and a recirculating piping 72 are cut (S10) to produce an opening 3.

From this opening 3, monitoring cameras and a prescribed repairing device (described later) are sequentially brought into the reactor pressure vessel 1. The repairing device, which has been brought in is used to conduct prescribed PT inspection, welding, polishing, PT inspection after welding, and the like (S11).

Then, the repairing device is brought out from the opening 3 (S12). The two parts of the recirculating water outlet nozzle 2, the recirculating water outlet nozzle safe end 71, and the recirculating piping 72, which are cut, are joined (S13). The nuclear pressure vessel 1 is filled with water (S14). The nuclear reactor well 95 is filled with water (S15).

The removed machines inside the reactor including the nuclear fuel assembly 96 are returned to the pressure vessel 1, and are installed (S16). Water is drained from the nuclear reactor well 96 (S17). The RPV head 95 is installed (S18).

The following section describes individual processes in FIG. 1 in detail.

Figure 2:
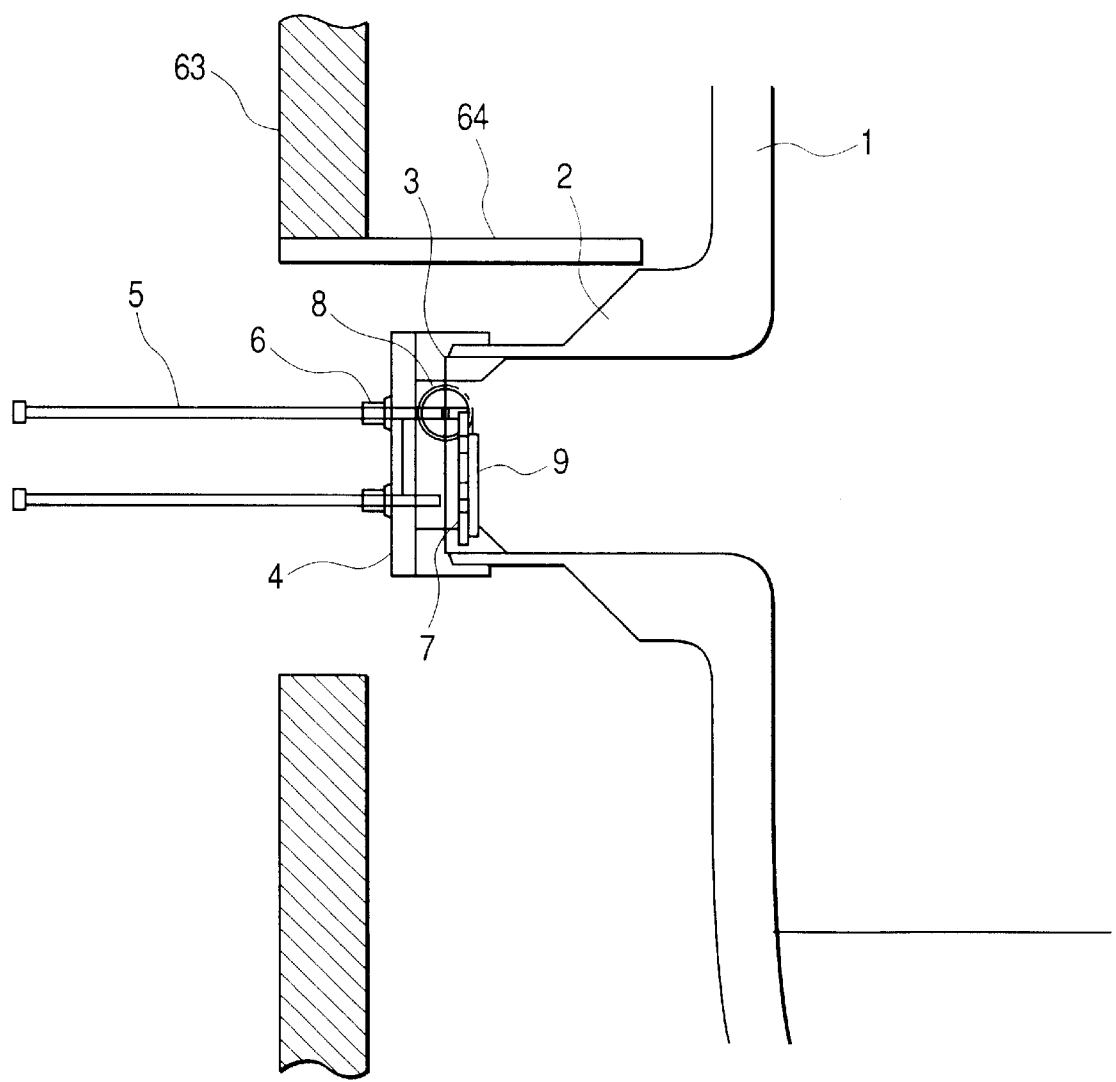
FIG. 2 is a diagram describing a jig for bringing in a device from a recirculating water outlet nozzle in an embodiment of the repairing method for a reactor pressure vessel with the present invention.

FIG. 2 details the jig for a bringing-in 4, which is used when the repairing device is brought in from the opening 3 after the recirculating outlet nozzle 2 is cut and the piping 72 is removed as a repairing method used in a state after the reactor water is drained in the process from S9 to S11 in FIG. 1.

The jig for bringing-in 4 is provided with slide shafts 5 supported by slide bearings 6, and a chain for suspending device 11 (described later) lifted up/down by a pulley 8 on a remotely operable electric lift. A lift member 9 is attached on the end of the chain 11. The repairing device 7 is held while the repairing device 7 is suspended to the lift member 9, as detailed later.

Fixing the jig for bringing-in 4 to an outer face of the opening 3 provides a setup for bringing in the repairing device 7 into the annulus 10. The repairing device 7 is a device used in PT inspection, welding, polishing, PT inspection after welding and the like, and is an embodiment of the present invention as described later.

Since radiation from inside the reactor leaks to the opening 3 coupled with the recirculating outlet nozzle 2, it is necessary to reduce radiation exposure of operators during setup for installing the jig for bringing-in 4. For that purpose, a shield plate made of metal with high shielding efficiency against radiation is provided on the jig for bringing-in 4, thereby providing a radiation shielding capability corresponding to estimated radiation dose.

A flange for socket and spigot mate is provided outside of the opening 3 on the jig for bringing-in 4 as described in the FIG., there by attaching to the opening 3 without a gap, resulting in restraining the leakage of the radiation sufficiently.

Since radioactivated machines in the reactor placed in a reactor core area above the recirculating water outlet nozzle 2 also irradiate radiation, a shield plate 63 made of gamma ray shield is attached above the opening 3 as needed.

Figure 3:
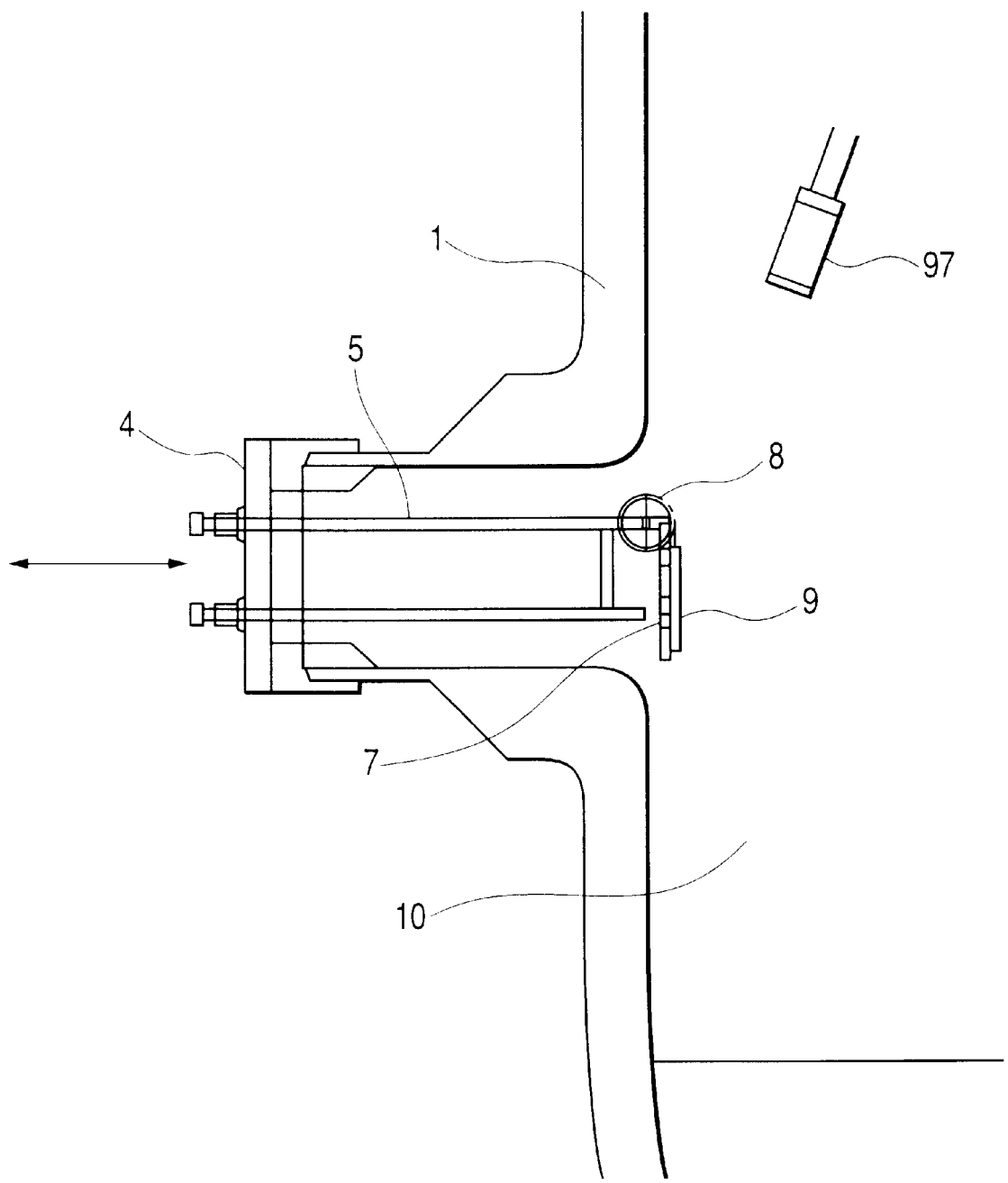
FIG. 3 is a diagram describing the jig for bringing in the device from the recirculating water outlet nozzle in the embodiment of the repairing method for a reactor pressure vessel with the present invention.

The slide shafts 5 of the jig for bringing-in 4 are slid manually or electrically as indicated by the arrow described in FIG. 3, thereby the repairing device 7 attached to the lift member 9 of the jig for bringing-in 4 into the annulus 10 in the pressure vessel 1.

The slide shafts 5 serve as a guide for bringing in the lift member 9 from the opening 3. The slide shafts 5 are not limited to a straight shape as indicated in the FIG. but they may be in arbitrary shapes such as a curved shape according to the bringing-in path.

The monitoring camera 97, which was brought in before hand is used to monitor a series of operations such as bringing in/out the repairing device 7, traveling the repairing device 7 described later, and repairing.

The monitoring camera 97 is brought in the process of Step S8 in FIG. 1. In place of this process, the monitoring camera 97 may be brought in with the jig for bringing-in 4 from the recirculating water outlet nozzle 2 to the annulus 10 when repairing.

Figure 4:
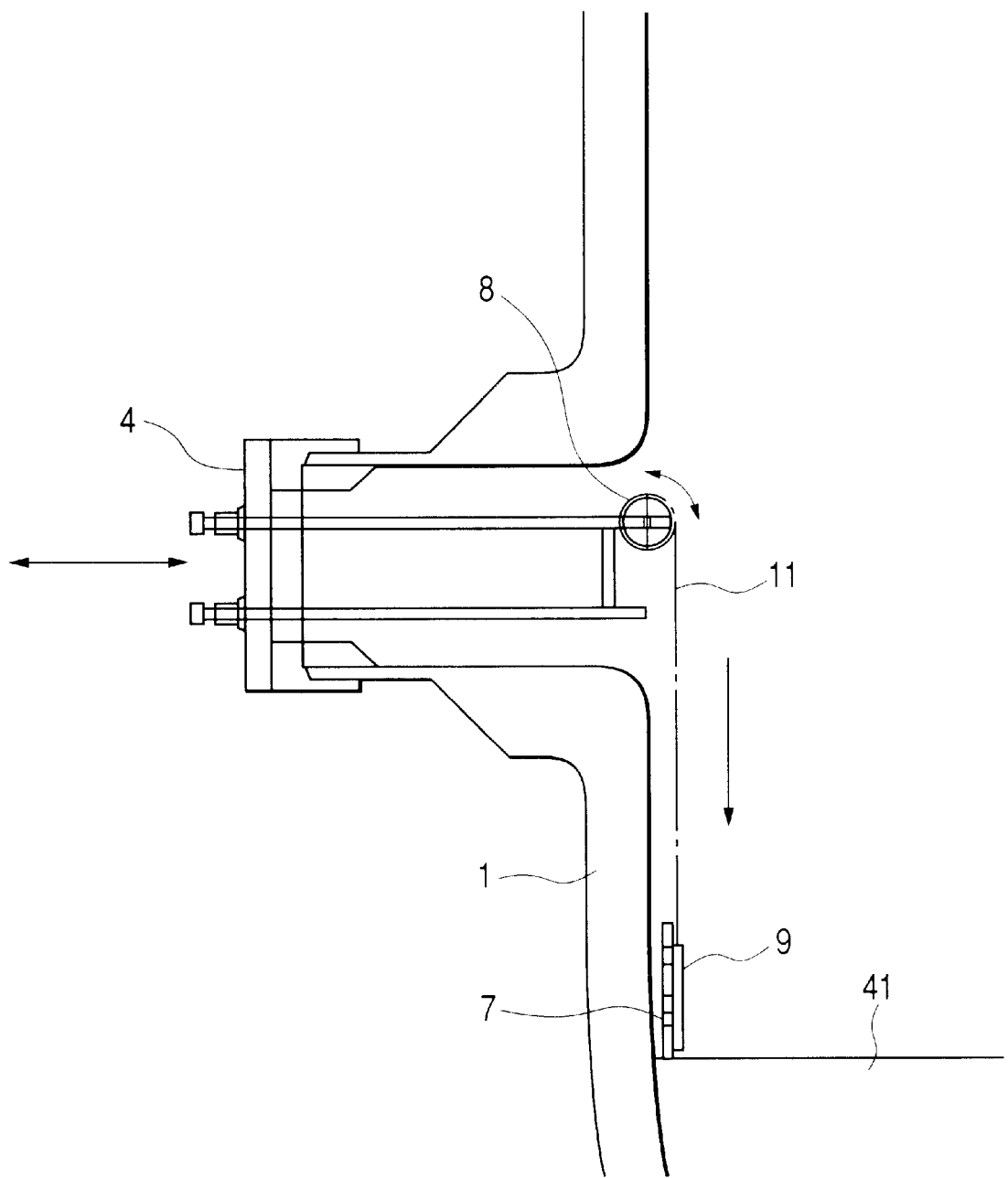
FIG. 4 is a diagram describing the jig for bringing in the device from the recirculating water outlet nozzle in the embodiment of the repairing method for a reactor pressure vessel with the present invention.

The repairing device 7, which is suspended from the lift member 9 of the jig for bringing-in 4 is lifted down while suspended along the inner wall face of the reactor pressure vessel 1 until the repairing device 7 seats on a baffle plate 41 by rotating the pulley 8 to extend the chain 11 downward as in FIG. 4.

Suction disk pads 12, which are not shown in this FIG. are mounted on the repairing device 7 as described later.

Figure 5:
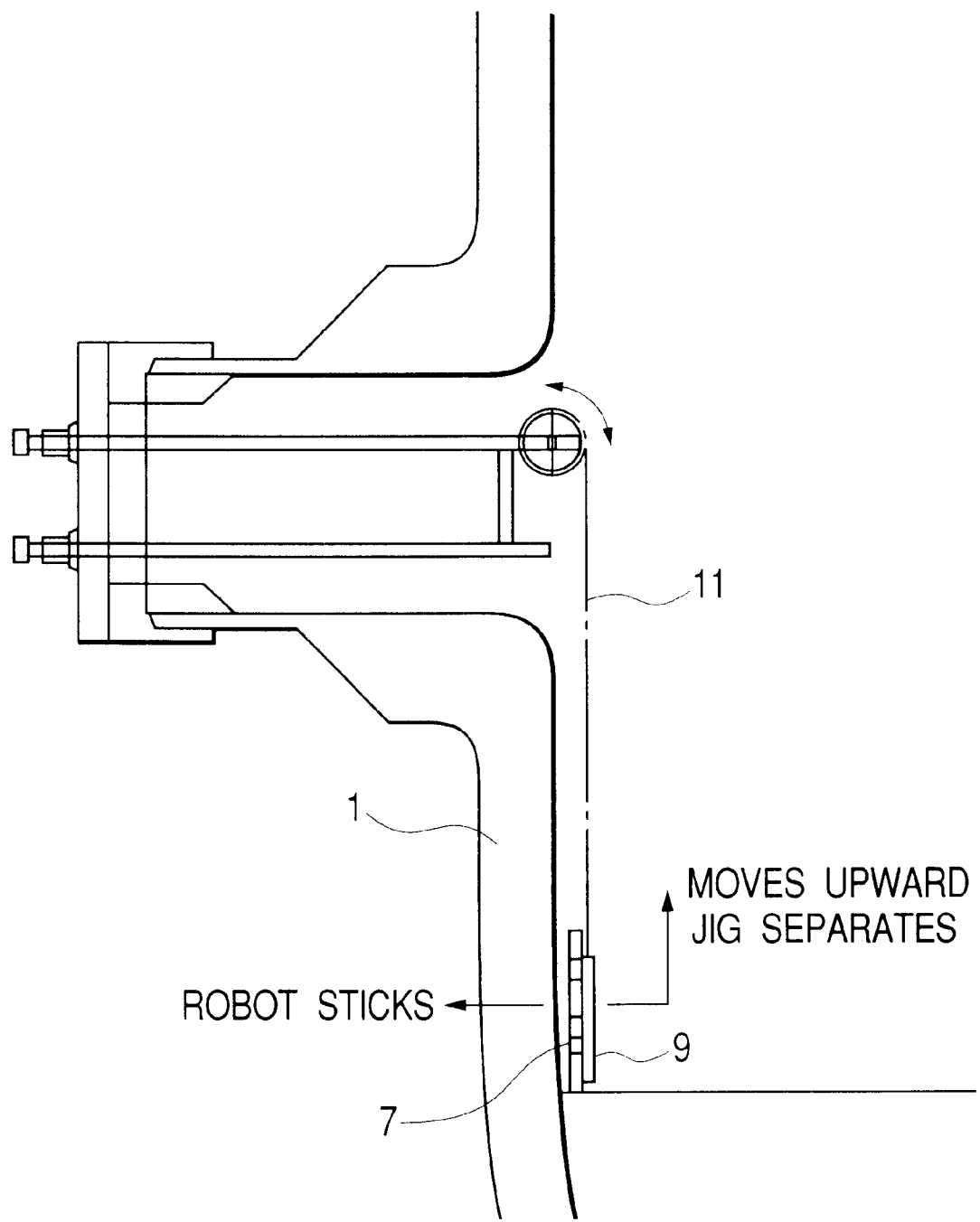
FIG. 5 is a diagram describing the jig for bringing in the device from the recirculating water outlet nozzle in the embodiment of the repairing method for a reactor pressure vessel with the present invention.

The repairing device 7 sticks to the inner wall face of the reactor pressure vessel 1 with the suction disk pads 12 as indicated in FIG. 5. The lift member 9 is detached from the repairing device 7 by slightly extending the slide shafts 5. The repairing device 7 is retained in the annulus 10 by winding the chain 11 with the pulley 8 to lift up the lift member 9.

FIG. 6 shows how to separate the repairing device 7 from the lift member 9.

The Step 1 in FIG. 6 shows a state where the lift member 9 holds the repairing device 7. As described in the FIG., pins 45 are provided at the top of the lift member 9, and holes 46 are provided at the op of the repairing device 7. The pins 45 are inserted into the holes 46 to hold the repairing device 7 to the lift member 9 while they are suspended.

After the repairing device 7 is stuck and held to the inner face of the reactor pressure vessel 1 with the suction disk pads 12 in the Step 1, as indicated by an arrow, the lift member 9 is lifted down by turning the pulley 8 to release the pins 4 of the lift member 9 from the holes 46 of the repairing device 7 as indicated in the Step 2.

In this Step 2, the slide shafts 5 of the jig for bringing-in 4 are slightly slid toward the center of the reactor pressure vessel 1. The repairing device 7 is completely detached from the lift member 9 as indicated in the Step 3.

The repairing device 7 is retained in the annulus 10 by winding up the chain 11 with the pulley 8 to lift the lift member 9 as indicated by an arrow, thereby returning the lift member 9 up to the height of the recirculating water outlet nozzle 2.

Figure 7A:
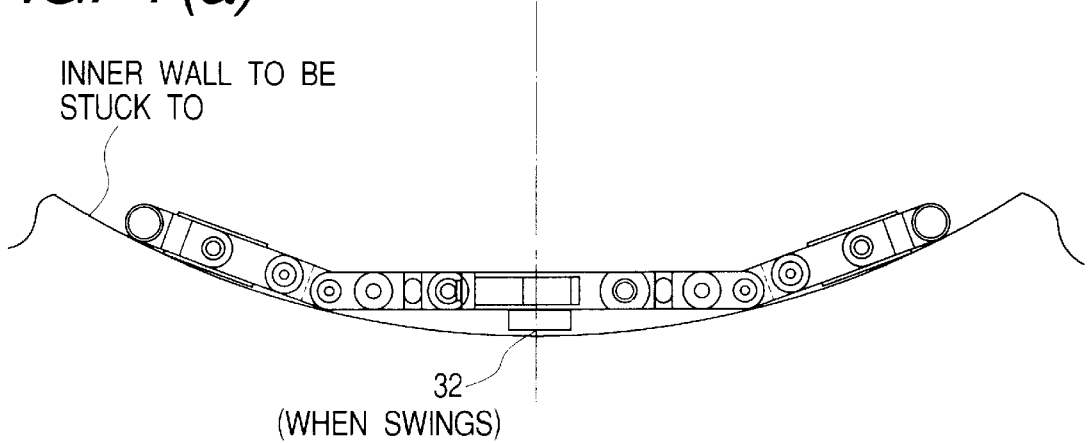
FIGS. 7(a), 7(b), and 7(c) are a top view, a top view, and a front view of an embodiment of a repairing device of the present invention.
Figure 7B:
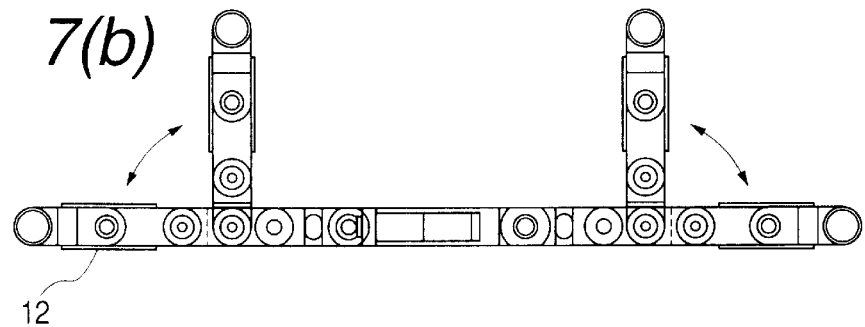
Figure 7C:
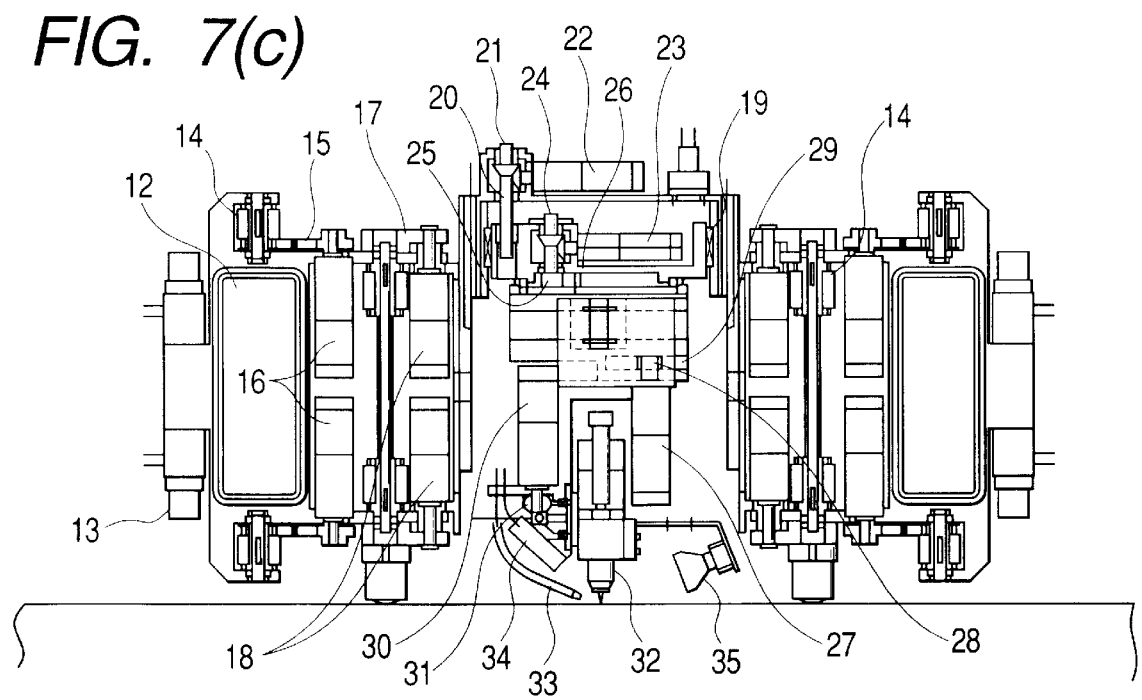

The repairing device 7 is described in detail in FIGS. 7(*a*), 7(*b*), and 7(*c*).

This repairing device 7 relates to an embodiment of the present invention as described before. The front view of the device is indicated in FIG. 7(*c*) and the top views of the device are indicated in FIGS. 7(*a*) and 7(*b*).

The repairing device 7 is provided with double-sided suction disk pads 12 for retaining the attitude of the entire device, pneumatic ejectors 13 for generating negative pressure inside the suction disk pads 12, and driving rollers 14 for traveling the device while maintaining the attitude by sticking to the wall face with the suction disks.

A suction device and a suction hose may replace the pneumatic ejectors 13.

Driving motors for traveling 16 transmit rotation torque to the driving rollers 14 through driving belts for traveling 15.

Total of eight driving rollers 14 are shown in FIG. 7(*c*). Among them, the motors drive four outer rollers on the top and bottom of the double-sided suction disk pads 12, and top and bottom driving rollers inside 14 are simple idle rollers to maintain the traveling attitude.

The repairing device 7 is provided with driving gears for folding 17 and driving motors for folding 18 to change the shape of the device body. These mechanisms allow the repairing device 7 to travel to a part to be repaired while taking required shapes.

FIGS. 7(*a*) and (2) of FIG. 7 7(*b*) show control states of the folded shape of the repairing device 7 with the driving motors for folding 18. As indicated in FIG. 7(*b*), the repairing device 7 can take a shape where parts on the both sides are folded at almost right angle with shafts of the driving rollers 14 in inner side as joints. With this, for example, the repairing device 7 can easily take a shape along a cylindrical surface aligned with the inner wall face of the reactor pressure vessel 1 as indicated in FIG. 7(*a*).

An operation tool for repairing loaded on the repairing device 7 can be brought to a part to be repaired.

The operation tool is loaded on the repairing device 7 such that the operation tool can take attitudes required for repairing, which allows moving the operation tool in up/down, forward/reverse, and left/right directions.

The forward/reverse direction here is the direction perpendicular to the paper of FIGS. 7(*a*), 7(*b*), and 7(*c*), and is the up/down direction in FIG. 7 FIG. 7(*c*).

The up/down motion of the operation tool is provided by a mechanism comprising slide rails 19 guiding an up/down travel, a lead screw 20 changing a rotating motion to the up/down drive, and a motor for up/down travel 22 rotating the lead screw 20 through gears 21.

The forward/reverse motion of the operation tool is provided by a mechanism where a motor for forward/reverse travel 23 rotates a pinion 25 through a gear 24, thereby moving a rack 26 attached to the operation tool in the forward/reverse direction.

The left/right motion of the operation tool is provided by a mechanism where a motor for left/right travel 27 rotates a pinion 28, thereby moving a rack 29 attached to the operation tool in the left/right direction.

This operation tool can be set to an optimal repairing angle according to a part to be repaired, and a mechanism comprising a motor for swinging the operation tool 30 and a gear 31 rotated by this motor is provided.

FIGS. 7(*a*), 7(*b*), and 7(*c*) show an embodiment of the repairing device where the device is provided with a welding torch for repairing with welding. The operation tool mounted on the repairing device 7 is not limited to the welding torch indicated here, and any tool such as a polishing grinder, a grinder, a camera for visual inspection, a head for applying/cleaning liquid penetrant for liquid penetrant flaw detecting inspection, and an observation head for liquid penetrant flaw detecting inspection can be attached.

The repairing device 7 in this embodiment is easily applied to different repairing operations such as polishing, grinding, visual inspection, liquid penetrant flaw detecting inspection, and ultrasonic flaw detecting inspection other than welding by attaching different types of operation tools to be used.

The welding torch shown in FIG. 7(*c*) comprises a TIG torch 32 including a tungsten electrode, a wire nozzle 33 serving as a guide for feeding a welding wire, a CCD camera 34 for observing the electrode, a part subject to welding, arc during welding, and a weld pool, and a lamp 35 providing a part to be welded with illumination, thereby enabling observation with the CCD camera 34 while welding is not conducted.

The position and attitude of the TIG torch 32 is arbitrarily controlled with individual mechanisms for driving the operation tool provided on the repairing device 7, thereby applying TIG welding to an arbitrary part to be repaired.

In FIG. 7(*a*), the TIG torch 32 in a state directed toward the inner wall of a part to which the repairing device sticks is shown as an example of the attitude.

Figure 8:
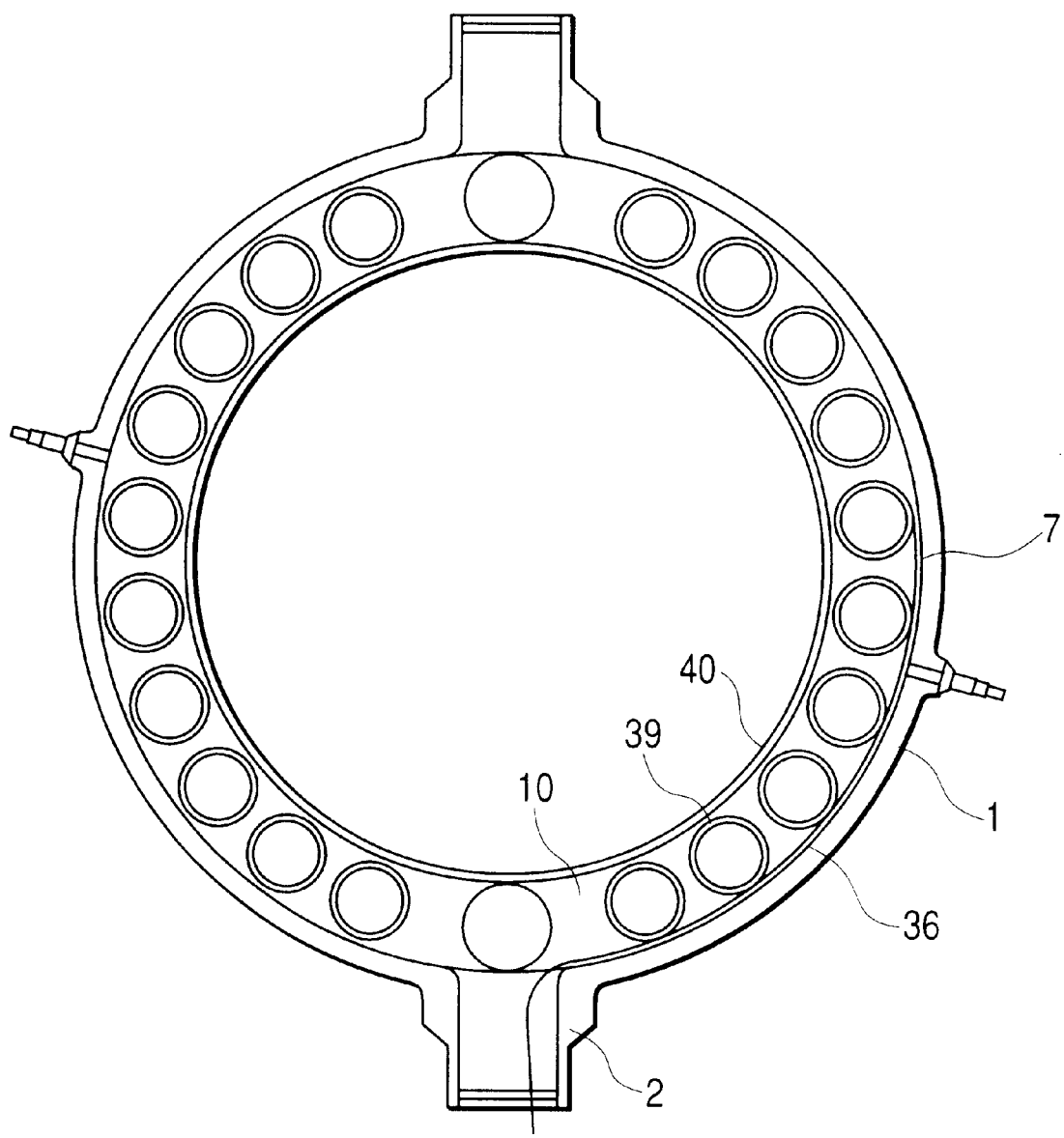
FIG. 8 is a diagram describing an annulus of a nuclear pressure vessel which is a subject of an embodiment of the repairing device with the present invention.

FIG. 8 shows a state where the repairing device 7 inserted from the recirculating outlet nozzle 2 has moved to a certain point subject to repairing in the annulus 10. This FIG. shows a case where the distance from the recirculating outlet nozzle 2 and the part subject to repairing is long.

If this is the case, it may be difficult to route cables and hoses to the repairing device 7.

Figure 9:
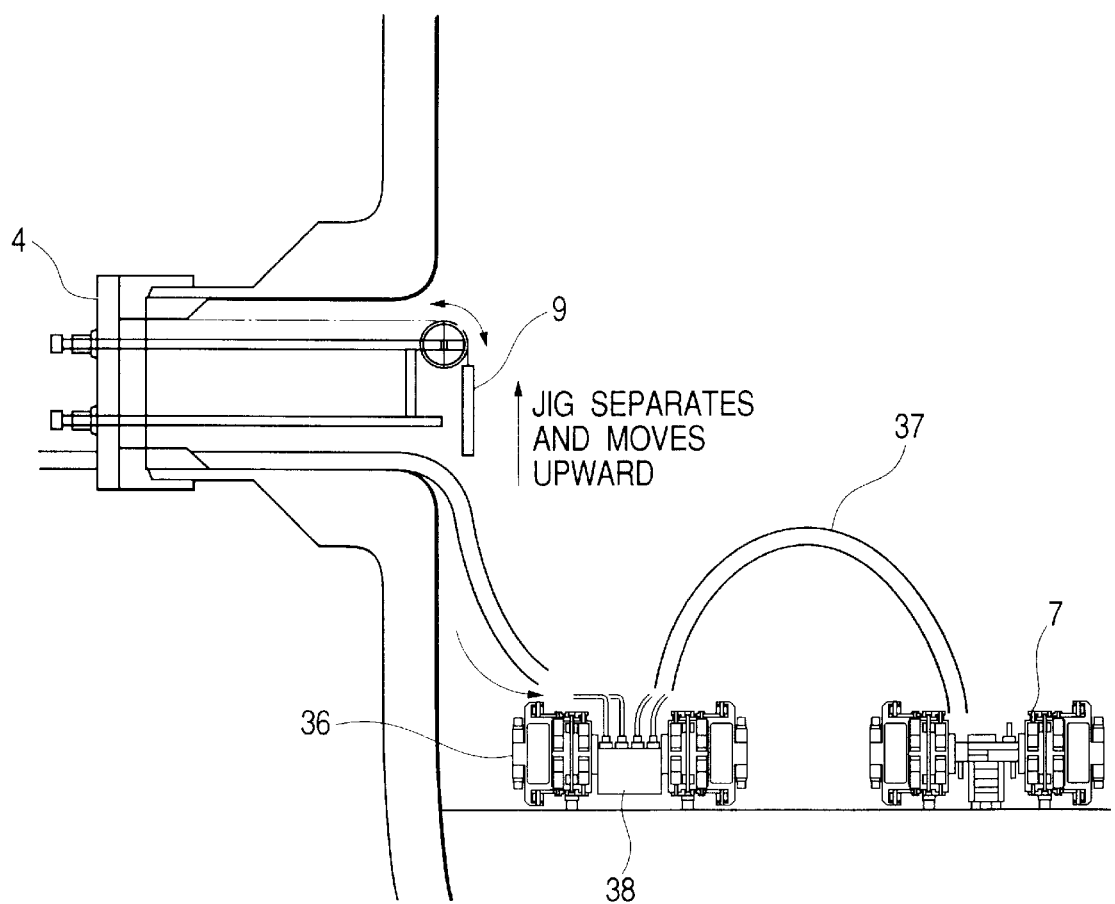
FIG. 9 is a diagram describing an embodiment of the repairing device with the present invention provided with a cable support head.

To address this problem, a cable support head 36 indicated in FIG. 9 is used, and is sequentially brought into the annulus 10 along with the repairing device 7 for relaying the hoses and cables. This cable support head 36 is also indicated in FIG. 8.

The cable support head 36 is provided with the driving mechanism for traveling, the driving mechanism for tuning, and the double-sided suction disk pads as the repairing device 7, and is provided with a relay box for cables and hoses 38 in place of the driving mechanism for the operation tool.

Since the cable support head 36 and the repairing device 7 are connected with a cable duct 37, the repairing device 7 and the cable support head 36 travel with maintaining a approximately constant distance, resulting in eliminating a load on the repairing device 7 caused by routing the cables.

With this embodiment, as indicated in FIG. 8, the repairing device can move up to the 90-degree direction in the circumferential direction in the annulus 10 from the recirculating outlet nozzle 2 while avoiding the jet pump 39 and routing the cables and hoses.

The repairing device 7 in this embodiment can change its folded shape as described in of FIG. 7 FIGS. 7(*b*) and 7(*c*).

This repairing device 7 can move to an outer face of a shroud support cylinder 40 from the inner wall face of the reactor pressure vessel 1 through a jet pump diffuser 39 in the annulus 10.

Figure 10:
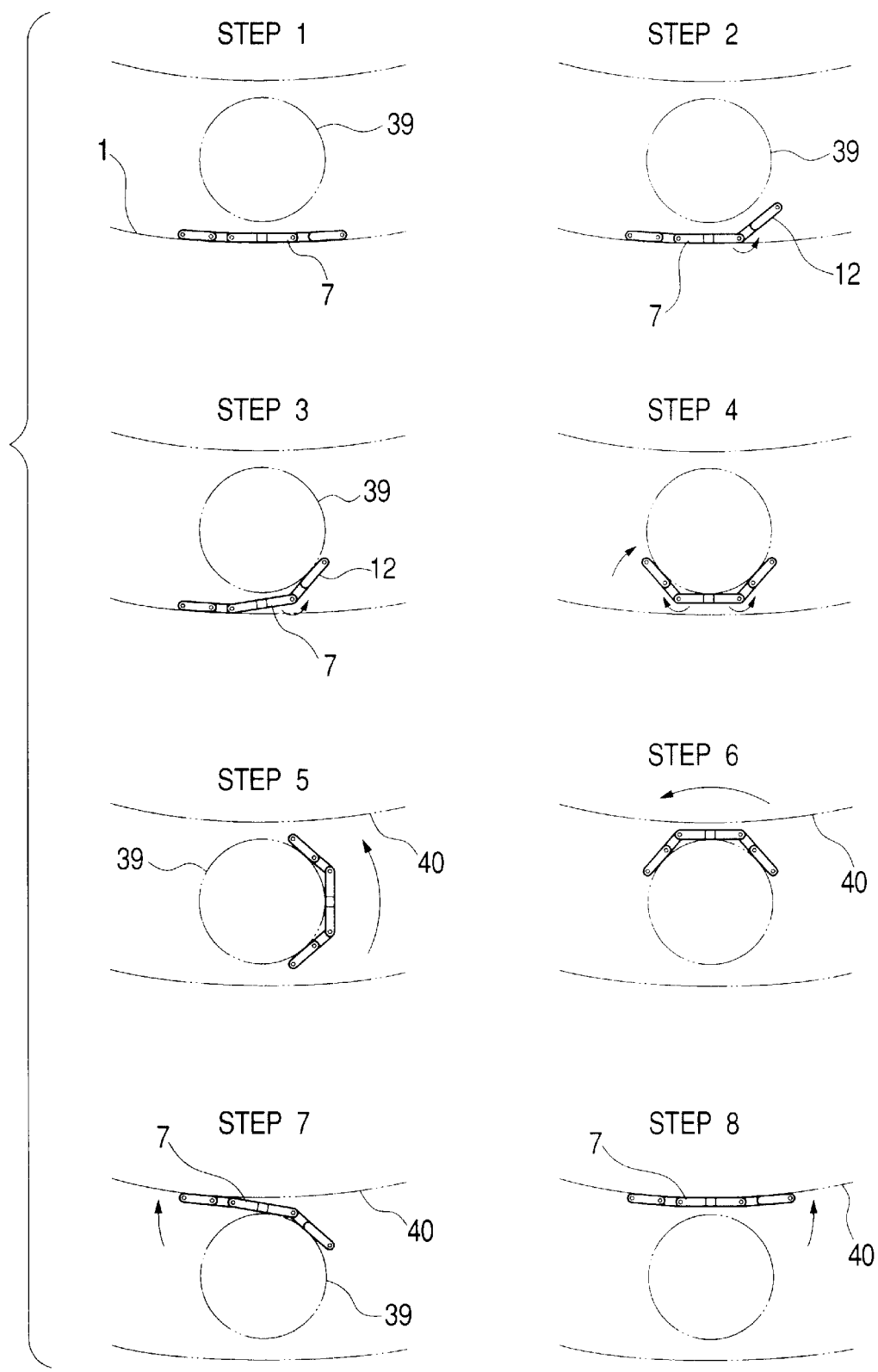
FIG. 10 is a diagram describing a method moving between walls for an embodiment of the repairing device with the present invention.

FIG. 10 describes this motion.

As described in the Step 1, the repairing device 7 sticks to the inner wall face of the reactor pressure vessel 1.

From the state in the Step 1, those suction disk pads 12 in one side of both the left and right side are released and the repairing device folds as indicated in Step 2 to move the double-sided suction disk pads 12 on the opposite side close to the jet pump diffuser 39. The repairing device 7 activates the suction disks on the rear side to stick to the jet pump diffuser 39, thereby entering a state indicated in the Step 3.

The suction disk pads 12 left on the inner wall side of the reactor pressure vessel 1 are released, are moved close to the jet pump diffuser 39 as described before, and stick to the jet pump diffuser 39, thereby moving over to the jet pump diffuser 39 completely as indicated in the Step 4.

The action of the pneumatic ejectors 13 generate the suction force of the suction disk pads 12, and the driving rollers for traveling 14 can receive a part of the suction force of the suction disk pads 12 by separating the suction disk pads 12 slightly from the face to stick to, thereby generating friction force between the driving rollers 14 and the wall face, resulting in enabling the travel.

The repairing device 7 travels around the jet pump diffuser 39 by driving the rollers 14 with the driving motors for traveling 16 as indicated in the Step 5. The repairing device 7 moves to the side of the shroud support cylinder 40 as indicated in the Step 6.

After the Step 6, the suction disk pads 12 and the turning mechanism are activated in a sequence reverse to that in the Step 2, and the repairing device 7 moves over from the jet pump diffuser 39 to the outer face of the shroud support cylinder 40, resulting in the state in the Step 8.

Using the double-sided suction disk pads 12 enables to move from one wall face to a neighboring wall face. With this moving method, the repairing device 7, which enters from the recirculating outlet nozzle, autonomously moves from the inner wall face of the reactor pressure vessel 1 to which the repairing device 7 sticks to the jet pump diffuser 39, and further to the shroud support cylinder 40, resulting in easily having access to any parts in the annulus 10 for the repairing operation.

Figure 11:
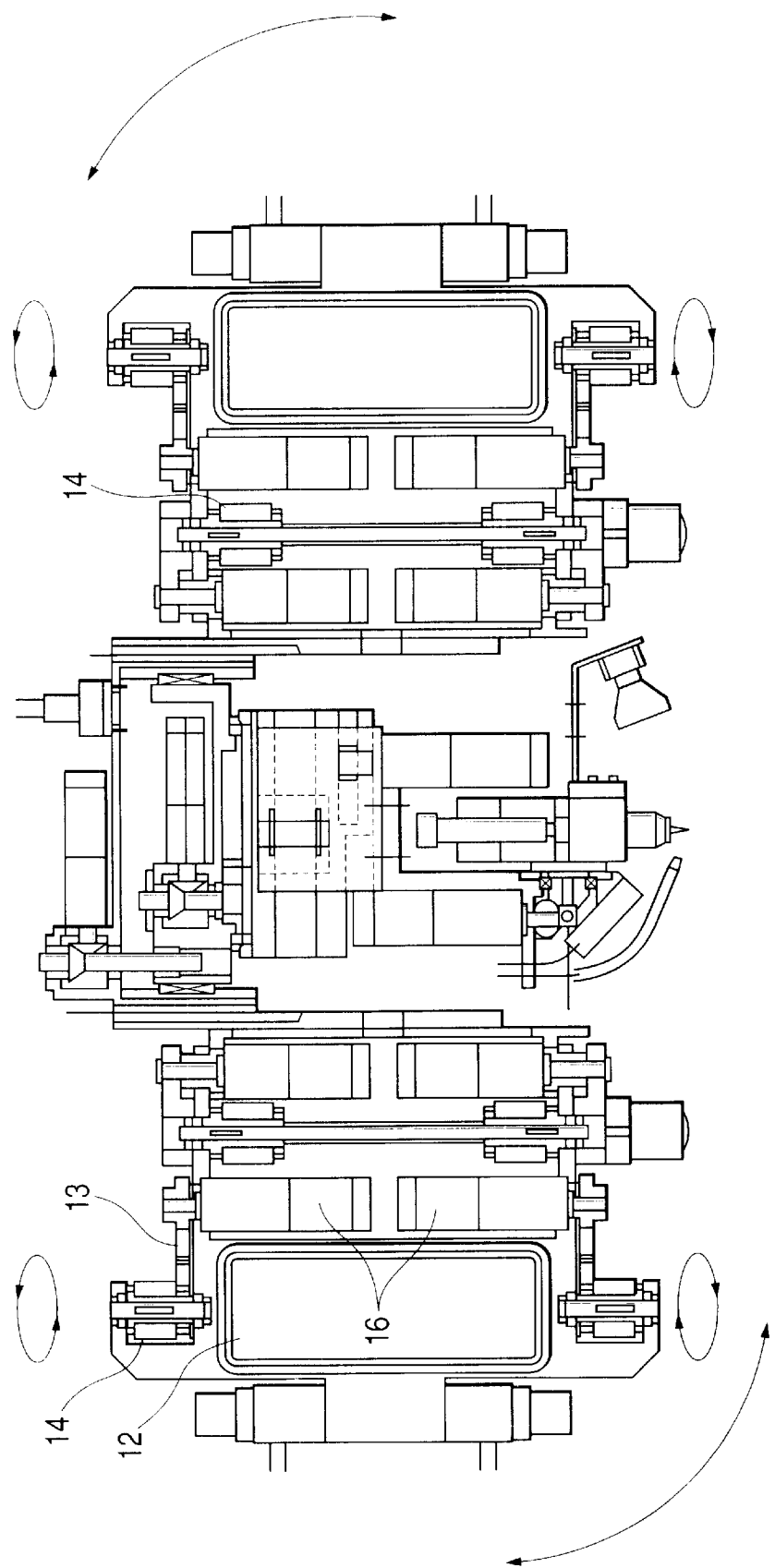
FIG. 11 is a diagram describing a rotating motion of an embodiment of the repairing device with the present invention.

The repairing device 7, which relates to this embodiment, rotates the top and bottom driving rollers for traveling 14 in directions opposite to each other to turn (rotate) the entire repairing device 7 on the inner wall face of the reactor pressure vessel 1 as in FIG. 11, resulting in providing a large degree of freedom to the attitude of the operation tool.

The annulus of the reactor pressure vessel, which is the subject of this embodiment, has an extremely strict dimensional restriction. The structures inside the reactor, which are installed in the annulus have large tolerances. Thus, it is highly provable that the traveling distance and the position in the peripheral direction of the repairing device 7 are not accurately obtained unless they are corrected with actual curvature radii.

The repairing device 7, which relates to this embodiment, takes advantage of the capability that it can take a folded shape to calculate the curvature radius of a face to which it sticks with the suction disk pads 12 from the folded angle. The following section uses FIG. 12 to describe the principle of detecting curvature radius.

The repairing device 7 is provided with encoders for detecting angles of joints and detecting the rotations of the driving rollers for traveling 14 respectively.

The joints here refer to parts where the repairing device 7 is folded as in FIGS. 7(a) and 7(b). In this case they are shafts for the driving rollers for traveling 14 on the inner side, and the angles of joints are the angles formed with the folded parts.

Figure 12:
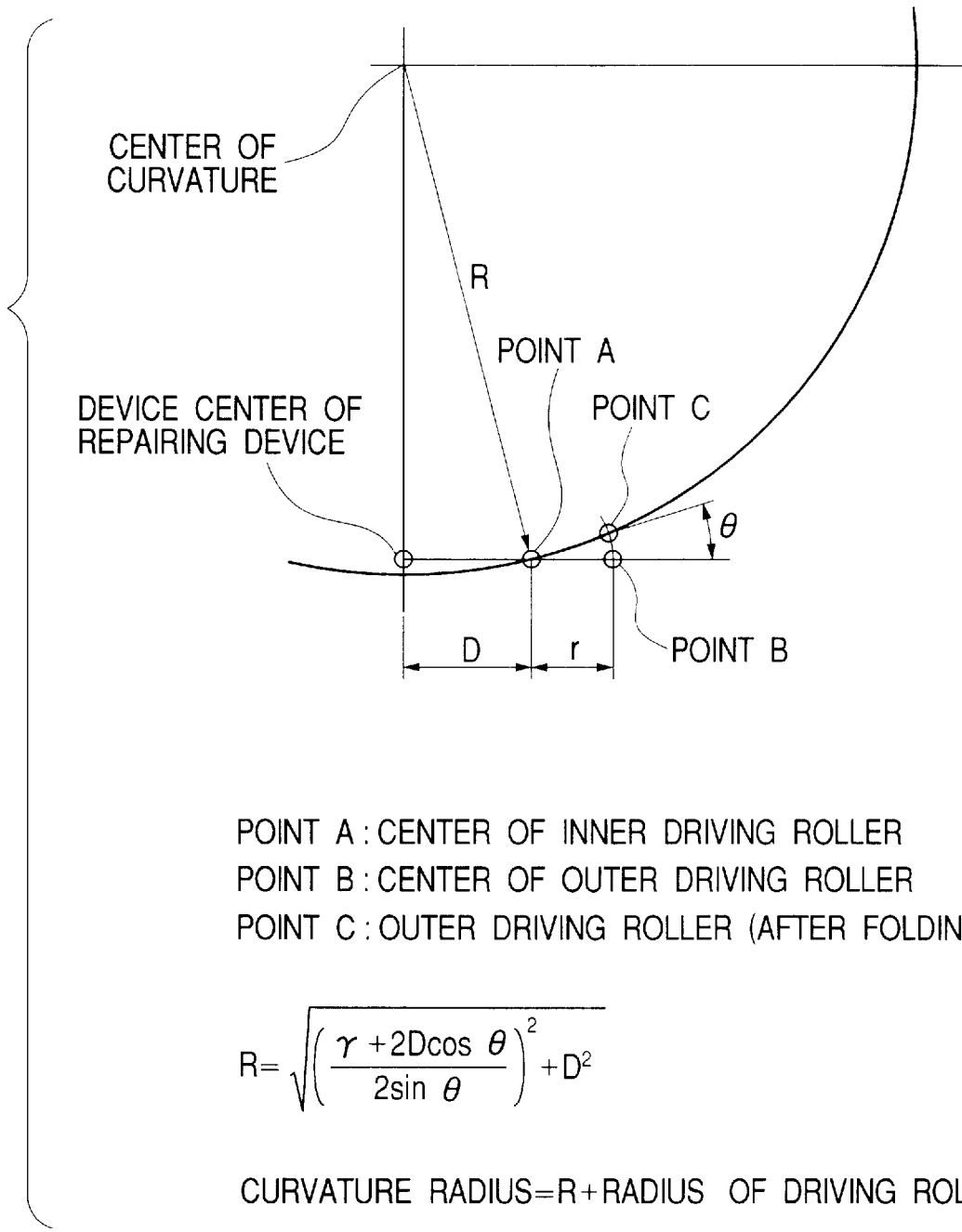
FIG. 12 is a diagram describing a principle for calculating a curvature radius of a structure for an embodiment of the repairing device with the present invention.

In FIG. 12, the Point A is the shaft of the joint, which is the center of the shaft of the inner driving rollers for traveling 14. The Point B and the Point C are the center of the shaft of the inner driving roller 14. The Point B indicates the position before folding, and the Point C indicates the position after folding.

The distance from the center of the device to the Point A is D. The distance from the Point A to the Point B is (r). The angle between the state where the device is in straight and the state where the device sticks to the wall face is θ. The angle θ can be read from the encoder, the distance D and the distance (r) are the dimensions of the device and are constants. The curvature radius is calculated using an equation indicated in the FIG. using numerical values of θ, D and (r).

The traveling distance of the repairing device 7 is obtained by reading the rotation from the encoder provided on the driving roller for traveling 14. Either the position the repairing device 7 in the peripheral direction of the RPV, in the peripheral direction of the jet pump diffuser, or in the peripheral direction of the shroud support cylinder is calculated accurately from the curvature radius and the traveling distance.

FIGS. 13(a) and 13(b) show an embodiment of the repairing device 7 when a subject to repairing has large protrusions and recesses such as a welded part inside the reactor pressure vessel 1, the device is not fixed stably only with the suction forces of the suction disk pads 12, and arms 47 extend toward a face opposite to the face to which the device 7 sticks, and pushes them to fix the device 7.

Clad welding of anti-corrosion metal is usually applied to the inner wall face of the reactor pressure vessel 1, and has protrusions and recesses more or less. It is possible that the suction capability of the suction disk pads 12 present a variation when the repairing device 7 is on the inner face of the reactor pressure vessel 1.

The repairing device 7 extends arms 47 to the opposing jet pump diffuser 39, and pushes it to fix itself, resulting in maintaining a stable attitude of the device in the case described before.

In the embodiment in FIG. 1, though the opening 3 is produced by cutting any two parts on the recirculating water outlet nozzle 2, the recirculating water outlet nozzle safe end 71, and the piping 72, the opening may be provided by removing the recirculating piping 72 from a recirculating pump (not included in the FIG.).

In this case, if the path for bringing-in from the opening on the piping to the recirculating water outlet nozzle 2 is vent, it is difficult to bring in the repairing device 7, and it is hardly possible to use the jig for bringing-in 4 described in FIGS. 2 to 5 to bring in.

Figure 14:
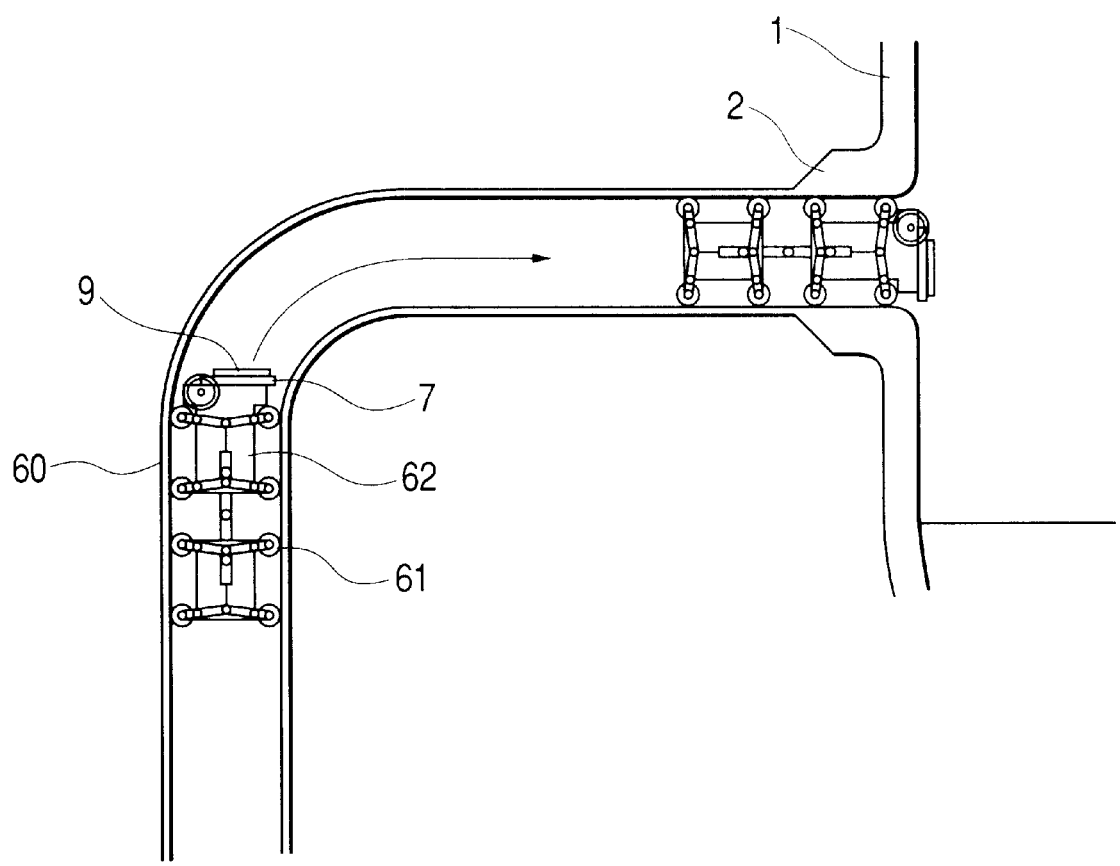
FIG. 14 is a diagram describing a motion for bringing in the repairing device through a bent part of a piping with an embodiment of the repairing device with the present invention.

FIG. 14 shows an embodiment of a device for bringing-in proper for such a case. The embodiment indicated in this FIG. uses a self-traveling bringing-in device 62 having wheels 61, which bring in the repairing device 7 to the annulus 10 thorough a recirculating piping 60 (=72).

The bringing-in device 62 constituted by coupling multiple carriages, which are provided with the wheels 61. This constitution allows bending the device freely, thereby smoothly passing through bent parts in the recirculating piping 60, resulting in bringing in/recovering the repairing device 7 to and from the recirculating water outlet nozzle 2.

Figure 15:
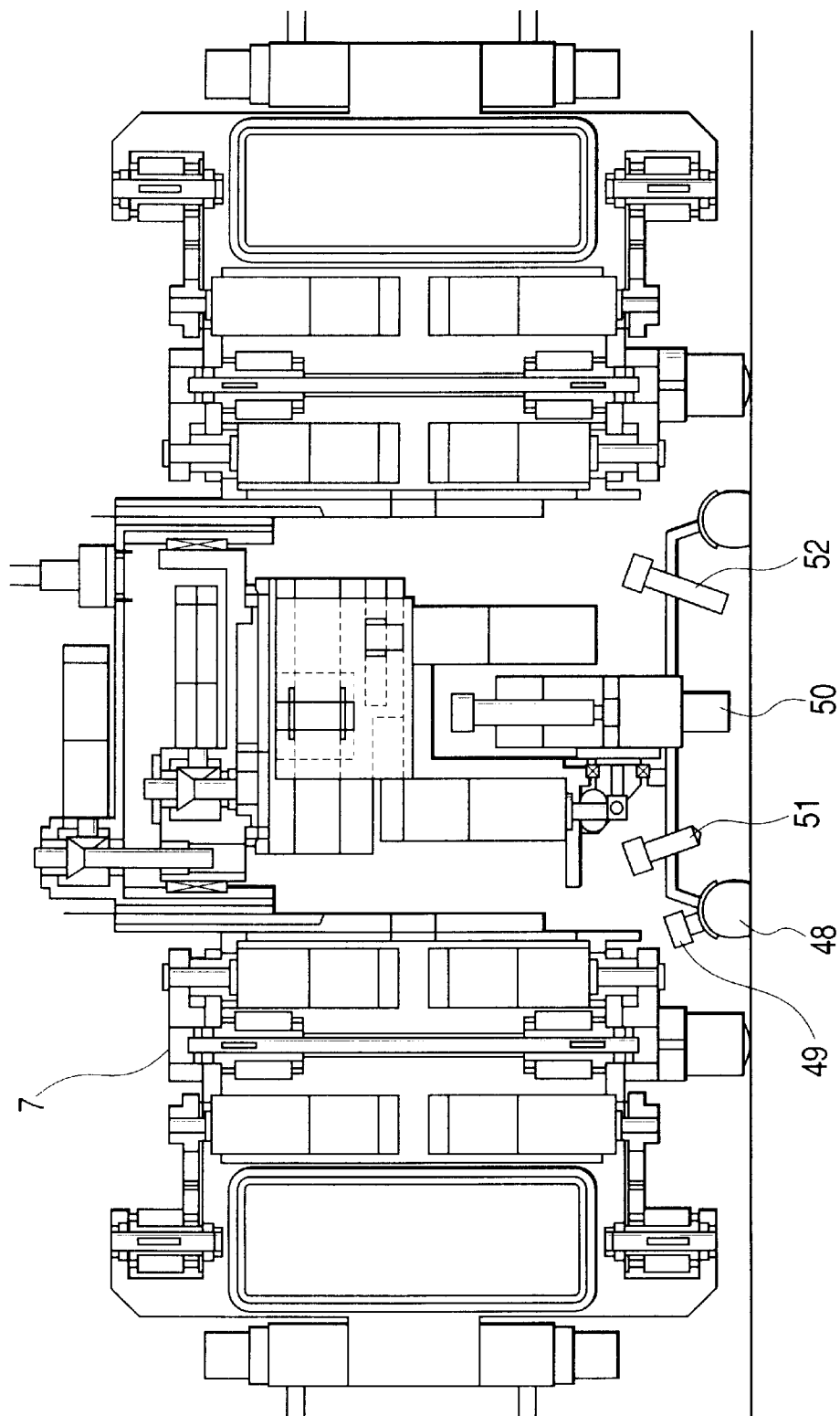
FIG. 15 is a diagram describing an embodiment of the repairing device with the present invention when the repairing device is applied to detecting flaws with liquid penetrant.

FIG. 15 illustrates an embodiment where a PT (liquid penetrant flaw detection) device is installed on the repairing device 7.

As described in FIG. 17, the annulus 10 is a space surrounded by the shroud support cylinder 40 and the baffle plate 41 in a circular shape. Since the annulus 10 is not especially provided with drain holes, tends to accumulate water, and is narrow, it is extremely difficult to dispose solution resulting from clearing the liquid penetrant for detecting flaws applied for the PT.

In the embodiment described in FIG. 15, a circular airbag 48 including an air joint 49 is provided around an application nozzle 50 attached to the repairing device 7. A cleaning nozzle 51 and a suction nozzle 52 are operated inside the airbag 48.

The airbag 48 is pressed to a part to be repaired, which requires inspection, to form an enclosed space around the part to be repaired, thereby eliminating the diffusion of liquid before the PT inspection. When the applied liquid is removed or cleaned, the suction nozzle 52 sucks the liquid to remove.

With this embodiment, the spatter and diffusion of the liquid penetrant or cleaning liquid over a wide area other than the part subject to repairing is prevented, thereby eliminating the necessity for placing a cleaning device or the like in a separated place.

Figure 16:
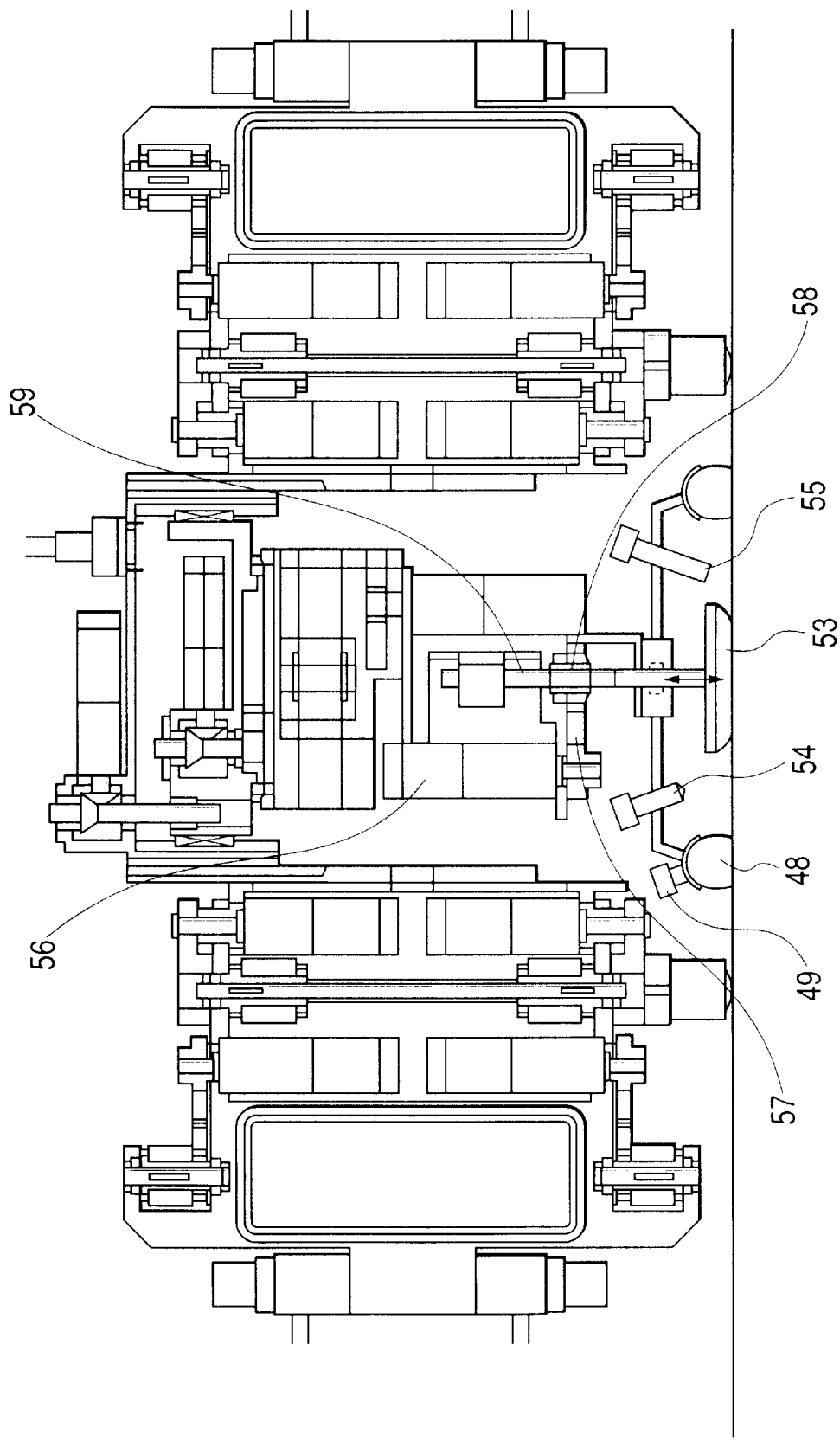
FIG. 16 is a diagram describing an embodiment of the repairing device with the present invention when the repairing device is applied to electric discharge machining in the air.

FIG. 16 shows an embodiment where an electric discharge machining device, which is operable in the air, is attached on the repairing device 7 relating to the present invention.

As described before, it is difficult to operate the repairing device in the water remotely from the top of the reactor pressure vessel. Also, since it is difficult to suck to dispose machining chips resulting from the electric discharge machining, the machining chips left on the bottom of the vessel after draining obstructs the operation.

In the embodiment in FIG. 16, the circular airbag 48 is provided around an electrode for electric discharge machining 53 of an electric discharge machining device as in the embodiment in FIG. 15, and a machining liquid injection nozzle 54 and a suction nozzle 55 are provided in the airbag 48. For electric discharge machining, the airbag 48 is pressed on a part to be repaired to form an enclosed space around the part to be repaired, machining liquid is filled in the space, and a motor for adjusting electric discharge gap 56 rotates a nut on a ball screw 58 through a belt 57.

Electric discharge operation is conducted while the motor for adjusting electric discharge gap 56 drives a ball screw shaft 59, which has the electrode for electric discharge machining 53, to maintain a required electric discharge gap. Simultaneously, the suction nozzle 55 sucks and removes the machining chips and the machining liquid, thereby enabling a local electric discharge machining in the air while keeping the ambient area clean.

With another embodiment of the present invention, as described later, a repairing operation from the inside of the reactor at the top of the reactor pressure vessel in parallel with the repairing operation from the annulus side as in the embodiment described before.

Figure 18:
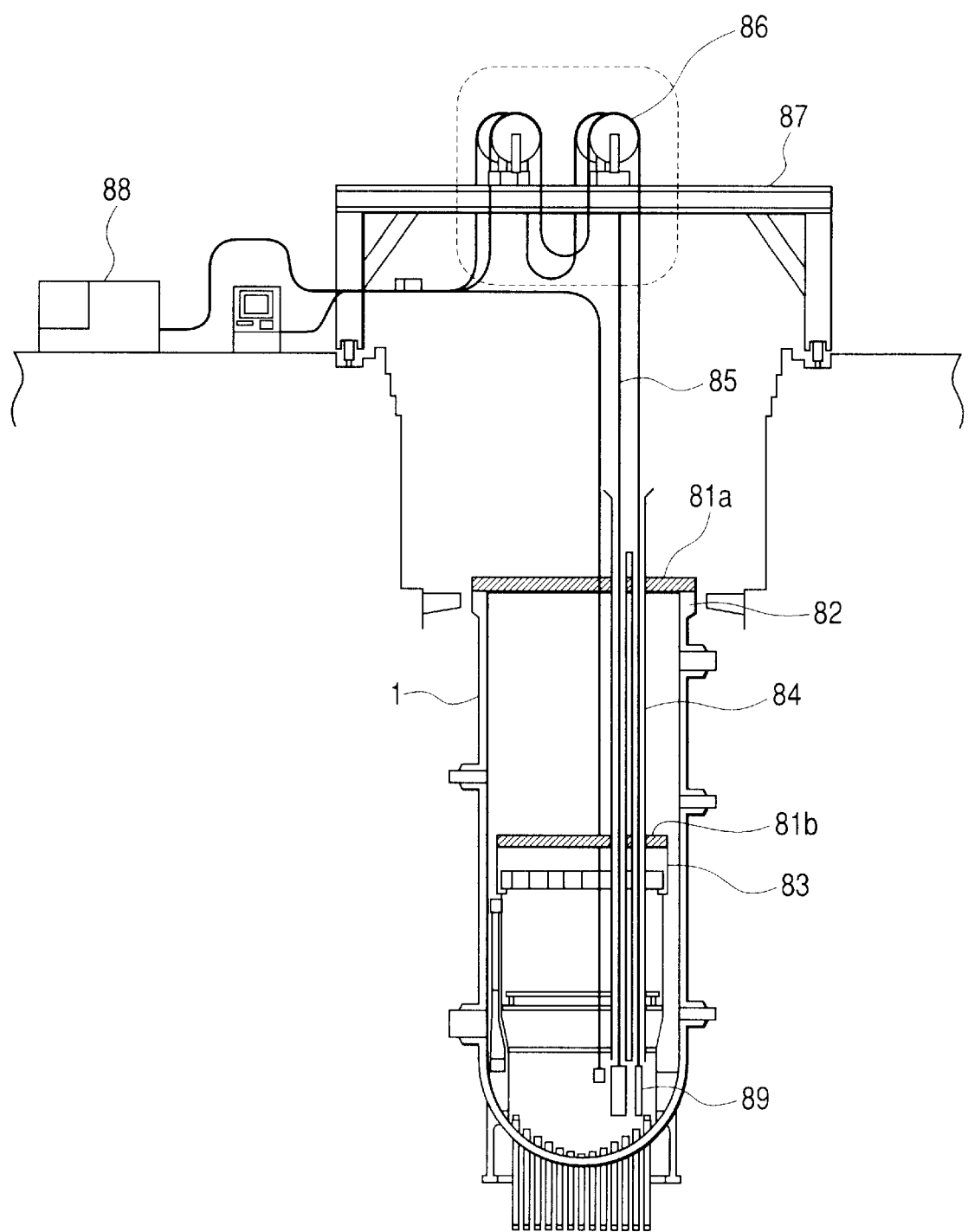
FIG. 18 is a diagram describing one example of an arrangement of machines inside the reactor when the repairing is conducted from the inside of the reactor.

FIG. 18 describes an example of arranging individual machines for the repairing operation from the inside of the reactor.

When the reactor water is drained from the reactor pressure vessel, a shield is required for operators on the top of the reactor, as described in the FIG. Preferably, a shield 81a is installed on the RPV flange 82, and more preferably, a shield 81b is installed on the RPV flange 82 and the shroud top flange 83. A guide pipe 84 for installing the repairing device is installed on the bottom of the reactor.

Up to now, the operation is conducted in well-drain state (water is filled in the reactor pressure vessel). Now the reactor water is drained, and the following installing operation is conducted without water.

A cable handling device 86 is installed on an operation carriage 87, and is moved over the reactor pressure vessel 1.

The cable handling device 86 is provided with a chain winding-up machine and a cable handling machine. The chain winding-up machine winds up/off a chain 85 for suspending a device. The cable handling machine winds up/off a cable connected to the device as the chain 85 moves up/down.

The chain 85 with strength required for supporting a load of the device to be brought into the reactor is used. The cable is connected to a control panel 88 on an operation floor.

A lift carriage 89, which is held for freely lifting up/down in the guide pipe 84 is attached to the end of the chain 85. The lift carriage 89 is used to bring the repairing device (not shown in the FIG.) into the reactor, and to install it.

Figure 19:
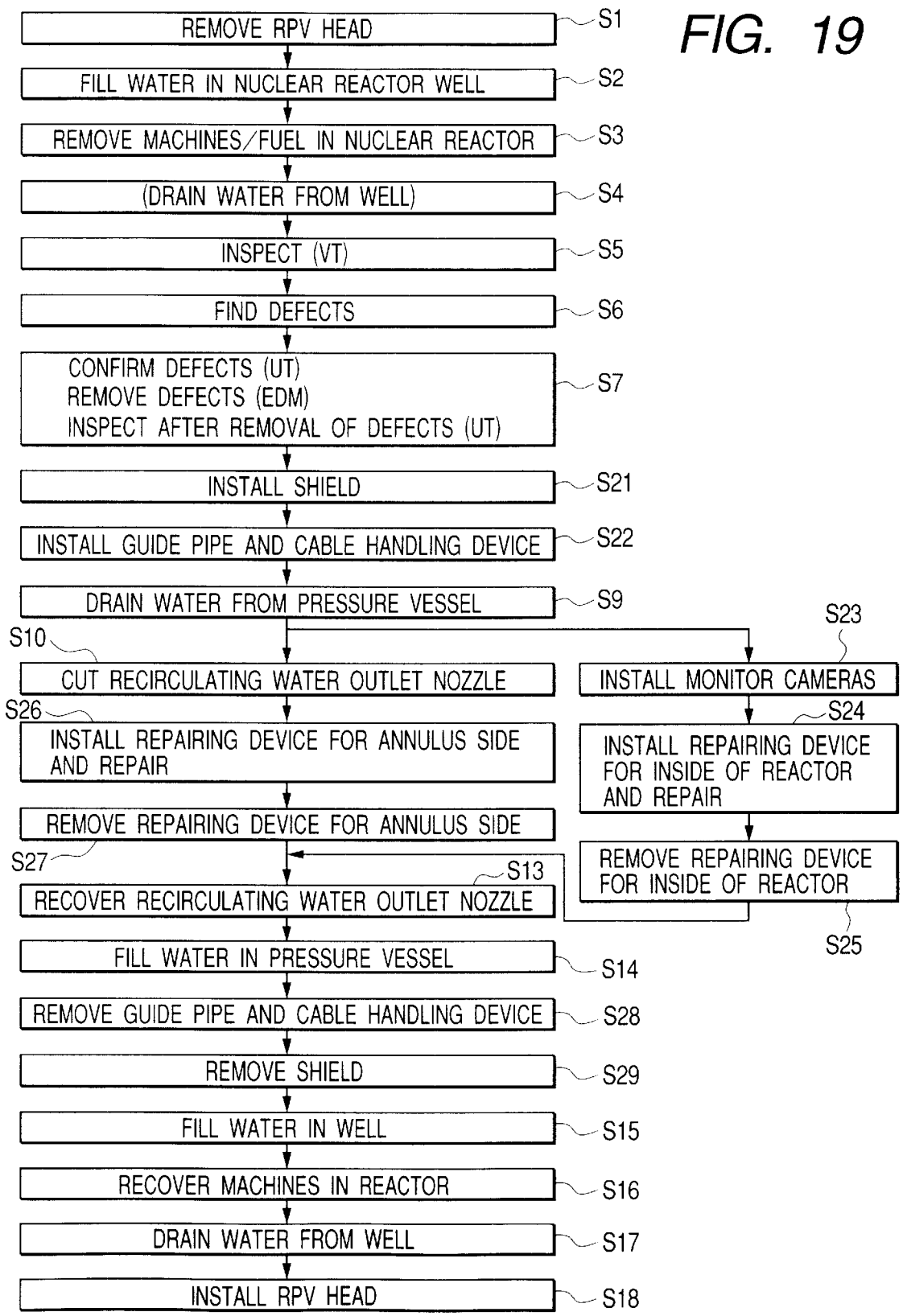
FIG. 19 is a flowchart indicating another embodiment of a repairing method for a reactor pressure vessel with this invention.

FIG. 19 is a flowchart showing typical steps for an embodiment of the present invention for the repairing method for the inside of the reactor pressure vessel allowing repairing from the both the annulus side and the inside of the reactor. A repairing device is brought in the opening either on the recirculating piping, the recirculating water outlet nozzle or the recirculating nozzle safe end. Also, another repairing device is brought in from the inside of the reactor from the top of the nuclear reactor through a guide pipe.

In FIG. 19, individual processes of S1 to S7, S9, S10, and S13 to S18 are identical to the embodiment described in FIG. 1. The description below also includes these processes.

The following section uses FIG. 19 with reference to FIG. 17.

A process of removing the RPV head 95 from the reactor pressure vessel 1, i.e. nuclear reactor opening process S1 starts.

The nuclear reactor well 94 is filled with water to reduce radiation exposure (S2). The machines inside the reactor such as the dryer 43 and the separator 44, and the nuclear fuel assembly 96 are removed from the reactor pressure vessel 1, and are taken out from the top (S3). Depending on the condition, a process for draining the water in the nuclear reactor well 94, i.e. well draining S4 is conducted.

The annulus 10 is inspected with VT (visual inspection) (S5). If a defect is found (S6), UT (ultrasonic flaw detecting inspection) is used to check the position and the extent of the defect. EDM (electric discharge machining) is employed to remove the defect. UT (ultrasonic flaw detecting inspection) is used to check if the defect is removed (S7).

The all devices used in this step are brought in from the top of the reactor.

The shield 81a and 81b are installed on the face of the RPV flange 82 and the face of the shroud top flange 83 for repairing from the inside of the reactor as described in FIG. 18 (S21). The guide pipe 84 is installed in the water (S22).

The reactor water in the pressure vessel is drained (S9) to enter an aerial state.

The process is divided into a process in the annulus side identical to those in FIG. 1 (S10, S26, S27), and a process in the inside of the reactor described to the right of the FIG. (S23, S24, S25). As the result, these processes are conducted in parallel. This is one characteristic of the embodiment of FIG. 19. However these processes may be conducted in serial.

First, the process in the inside the reactor (S23, S24, S25) is described. For this process, at least one monitoring camera is installed for monitoring the entire repairing operation (S23).

This process for installing monitoring cameras may be conducted in the process on the annulus side (S10, S26, S27). In this case, the number of installations may be minimized or the process may be skipped.

The repairing device is brought in from the inside of the reactor through the guide pipe 84, and the repairing operation is conducted (S24). After the operation, the repairing device is brought out from the guide pipe 84 in the same manner (S25), and the process continues to S13.

Now, the process in the annulus side (S10, S26, S27) is described. An opening 3 is produced by cutting any two parts of the recirculating water outlet nozzle 2, the recirculating water outlet nozzle safe end 71, and the recirculating piping 72 (S10).

The monitoring camera and the prescribed repairing device are sequentially brought into the reactor pressure vessel 1 from the opening 3. The repairing device brought in is used to conduct prescribed PT inspection, welding, polishing, and PT inspection after welding (S26). The process of S26 is identical to S11 in the embodiment in FIG. 1.

The repairing device is brought out from the opening 3 (S27). The process of S27 is also identical to S12 in the embodiment in FIG. 1.

Also, the process continues to S13.

After the repairing on the annulus side and the inside the reactor are completed, i.e. the process of S25 and the process of S27 are finished, the recirculating water outlet nozzle 2, the recirculating water outlet nozzle safe end 71, and/or the piping 72, which are previously cut are coupled (S13). The pressure vessel 1 is filled with water (S14).

The guide pipe described in FIG. 18 is removed (S28). The shields 81a, 81b are removed (S29).

The nuclear reactor well 95 is filled with water (S15). Removed machines inside the reactor including the nuclear fuel assembly 96 are returned to the pressure vessel 1, and are installed (S16). Water is drained from the nuclear reactor well 96 (S17). The RPV head 95 is installed (S18).

With the embodiment in FIG. 19, as described before, the repair operation is conducted almost in parallel in the annulus side and inside of the reactor, thereby reducing the operation period, and a repairing operation which is difficult to conduct from only one side of the pressure vessel can be conducted from the both sides.

Figure 20:
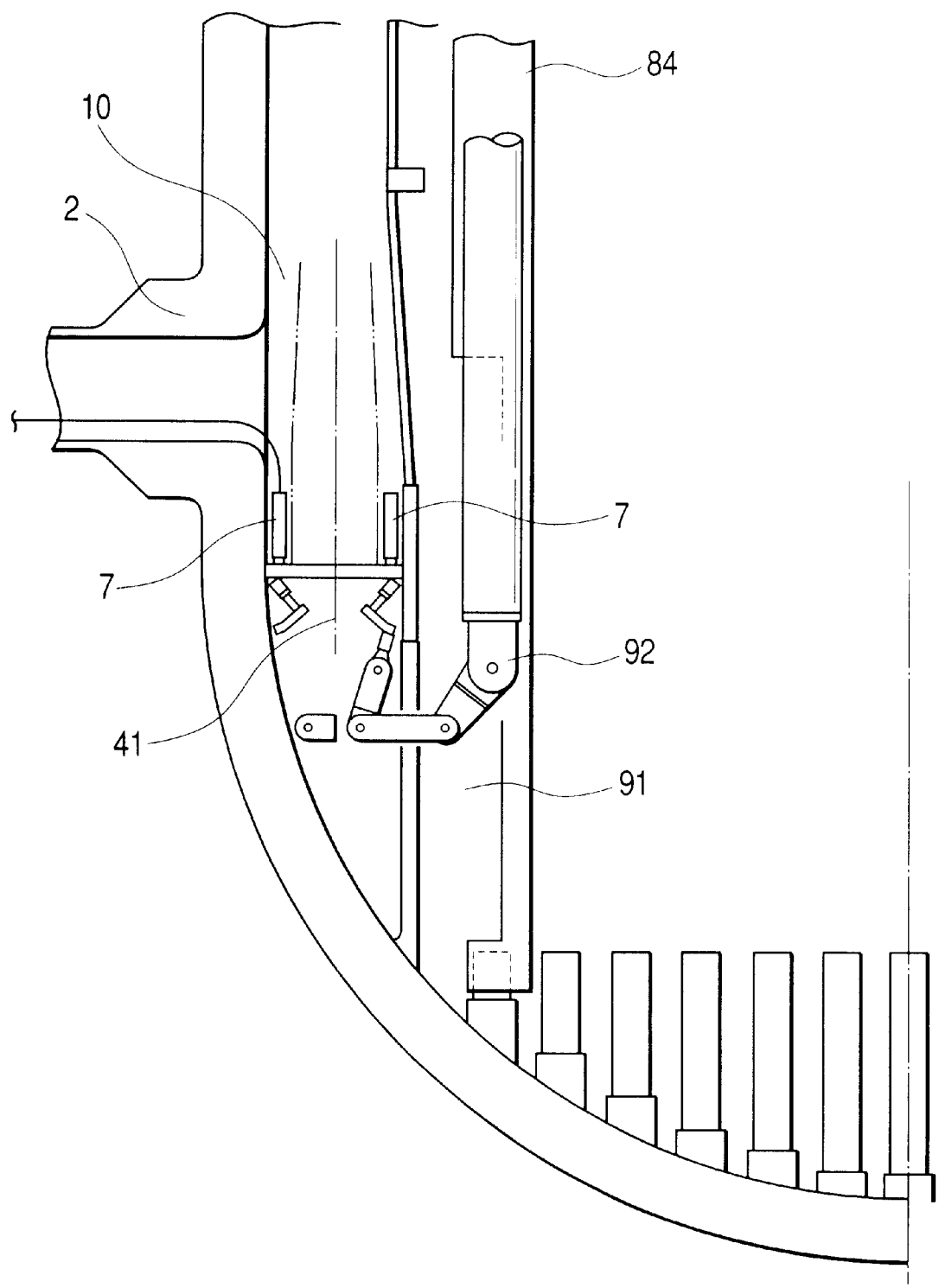
FIG. 20 is a diagram describing an example of an arrangement of devices in an embodiment of the present invention when repairing is conducted from both the annulus side and the inside of the reactor.

FIG. 20 exemplifies a repairing operation when the baffle plate 41, which is one of the structures in the reactor facing the annulus 10, is repaired in accordance with the embodiment described in FIG. 19. FIG. 20 is an example of an arrangement of the machines when the repairing from the inside of the reactor described in FIG. 18.

As described before, the repairing device 7 brought in from the recirculating water outlet nozzle 2 repairs on the annulus 10 side.

The repairing device in the inside of the reactor 92 through the guide pipe 84 repairs on the inside of the reactor 91.

With this embodiment, the individual repairing devices 7, 92, which are brought in, repair from the both the annulus side and the inside of the reactor alternately or simultaneously. This enables to repair the same position from the both sides when repairing from one side is difficult, such as a defect passing through the annulus and the inside of the reactor, or a deep defect on one side which is difficult to be repaired from that side.

When the repairing device 7 for the annulus side is brought in from the top of the reactor through the guide pipe 84, which is not described in a drawing, repairing is conducted in the device arrangement identical to that described above.

The present invention especially reduces the number of operations for raising/lowering water level when at least either a reactor pressure vessel or a structure in the reactor is repaired while the nuclear power plant is in service, thereby reducing the operation period and facilitating the positioning for the device.

The present invention also eliminates waterproof capability for a repairing device, thereby simplifying the structure, and simultaneously restraining a distance traveling in an area with a high radiation dose to the required minimum when the repairing device is installed in an annulus, thereby reducing the time for installing the repairing device, resulting in minimizing the capability degradation of the repairing device caused by radiation.

The present invention allows repairing from both an annulus side and an inside of a reactor, thereby repairing a wide area reliably, efficiently and healthfully.

As the result, the present invention enables an efficient repairing when repairing a structure in the annulus is required, thereby maintaining the health of the plant, resulting in contributing to the safety and the stability of the operation of the nuclear power plant.

What is claimed is:

1. A method for repairing the inside of a reactor pressure vessel for a boiling water reactor provided with a recirculating nozzle, said reactor pressure vessel and a core shroud disposed inside said reactor pressure vessel defining an annulus surrounded thereby, the method comprising:

draining coolant in said reactor pressure vessel;

cutting a recirculating piping connected to said recirculating nozzle to produce an opening connected to said recirculating nozzle;

bringing a repairing device into said annulus in said reactor pressure vessel from said opening; and using said repairing device to repair the inside of said annulus.

2. A method for repairing the inside of a reactor pressure vessel according to claim 1 wherein at least either inspecting a repaired part with a camera, installing monitoring cameras during repairing, detecting flaws with ultrasonic, or beveling for repairing with electrical discharge machining is conducted from the top of said pressure vessel before the coolant in said reactor pressure vessel is drained.

3. A method for repairing the inside of a reactor pressure vessel for a boiling water reactor according to claim 1, the method further comprising:

lifting up/down said repairing device, brought into said annulus, with a jig for lifting-up/down;

separating said repairing device from said jig for lifting-up/down after said repairing device reaches the height of a baffle plate provided on a bottom side of said annulus at a lower position than that of said recirculating nozzle;

installing said repairing device on said jig for lifting-up/down again after repairing the inside of the reactor; and recovering said repairing device from the inside of the reactor.

4. A method for repairing the inside of a reactor pressure vessel according to claim 3, wherein said jig for lifting-up/down is brought in by a straight or curved guide held by a jig for bringing-in through said opening.

5. A method for repairing the inside of a reactor pressure vessel according to claim 4, herein said jig for bringing-in is provided with a member for shielding radiation so as to add a function for shielding radiation irradiated from the reactor pressure vessel when an operator comes close to a cut part on a recirculating piping, an outlet nozzle for recirculating water, or a safe end of the outlet nozzle for recirculating water.

6. A method for repairing the inside of a reactor pressure vessel according to claim 4, wherein said jig for bringing-in is provided with a bendable self-traveling mechanism, and is constituted so as to travel by itself to bring in said repairing device when said repairing device is brought into the reactor pressure vessel through a bent piping from said opening.

7. A method for repairing the inside of a reactor pressure vessel according to claim 1, wherein said repairing device repairs a structural part or parts inside said annulus.

\* \* \* \* \*